United States Patent
Kim et al.

(10) Patent No.: US 10,459,614 B2
(45) Date of Patent: Oct. 29, 2019

(54) SYSTEM AND METHOD FOR CONTROLLING OBJECT MOTION BASED ON TOUCH

(71) Applicant: HiDeep Inc., Gyeonggi-do (KR)

(72) Inventors: Jongsik Kim, Gyeonggi-do (KR);
Seyeob Kim, Gyeonggi-do (KR);
Yunjoung Kim, Gyeonggi-do (KR);
Hyongsub Yun, Gyeonggi-do (KR);
Sangsic Yoon, Gyeonggi-do (KR);
Bonkee Kim, Gyeonggi-do (KR);
Hojun Moon, Gyeonggi-do (KR);
Taehoon Kim, Gyeonggi-do (KR);
Sunyoung Kwon, Gyeonggi-do (KR)

(73) Assignee: HIDEEP INC. (KR)

( * ) Notice: Subject to any disclaimer, the term of this patent is extended or adjusted under 35 U.S.C. 154(b) by 274 days.

(21) Appl. No.: 14/560,359

(22) Filed: Dec. 4, 2014

(65) Prior Publication Data
US 2015/0153942 A1 Jun. 4, 2015

(30) Foreign Application Priority Data

Dec. 4, 2013 (KR) .................. 10-2013-0149946
Dec. 9, 2013 (KR) .................. 10-2013-0152493
(Continued)

(51) Int. Cl.
*G06F 3/0484* (2013.01)
*G06F 3/041* (2006.01)

(52) U.S. Cl.
CPC ........ *G06F 3/04847* (2013.01); *G06F 3/0414* (2013.01)

(58) Field of Classification Search
CPC .................. G06F 3/0481; G06F 3/04812
See application file for complete search history.

(56) References Cited

U.S. PATENT DOCUMENTS 6,690,365 B2 * 2/2004 Hinckley ............ G06F 3/03547
345/173
7,577,925 B2 * 8/2009 Zotov ................. G06F 3/0418
345/173
(Continued)

FOREIGN PATENT DOCUMENTS

JP 2011039633 2/2011
JP 2011141340 7/2011
(Continued)

OTHER PUBLICATIONS

Corresponding Office Action issued by the JPO dated Dec. 22, 2015.
(Continued)

*Primary Examiner* — Ryan F Pitaro
(74) *Attorney, Agent, or Firm* — The Belles Group, P.C.

(57) ABSTRACT

An object action control system which performs a method for controlling the object action on the basis of a single touch or multiple touches may be provided that includes: a touch panel; a touch sensing module which recognizes a single touch or multiple touches on the touch panel by at least one input means; a change sensing module which senses at least any one of a pressure magnitude, area and time period of the touch on the touch panel by the input means which has applied the single touch and multiple touches; and an action module which performs different actions of one object in accordance with the single touch or multiple touches in conformity with a predetermined action standard.

5 Claims, 17 Drawing Sheets

(30) Foreign Application Priority Data

| Mar. 20, 2014 | (KR) | 10-2014-0032862 |
|---|---|---|
| Mar. 24, 2014 | (KR) | 10-2014-0034169 |
| May 9, 2014 | (KR) | 10-2014-0055732 |
| Aug. 1, 2014 | (KR) | 10-2014-0098917 |
| Sep. 19, 2014 | (KR) | 10-2014-0124920 |
| Oct. 24, 2014 | (KR) | 10-2014-0145022 |

(56) References Cited

U.S. PATENT DOCUMENTS

| 7,760,187 B2* | 7/2010 | Kennedy | G06F 3/0414 345/173 |
|---|---|---|---|
| 2009/0160793 A1* | 6/2009 | Rekimoto | G06F 3/0414 345/173 |
| 2009/0219247 A1* | 9/2009 | Watanabe | G06F 1/1615 345/157 |
| 2009/0237421 A1* | 9/2009 | Kim | G06F 3/0485 345/661 |
| 2010/0033441 A1* | 2/2010 | Park | G06F 3/044 345/173 |
| 2010/0283750 A1* | 11/2010 | Kang | G06F 3/0416 345/173 |
| 2010/0321319 A1* | 12/2010 | Hefti | G06F 3/04883 345/173 |
| 2012/0311438 A1* | 12/2012 | Cranfill | G06Q 20/123 715/256 |
| 2013/0044062 A1* | 2/2013 | Bose | G06F 3/0414 345/173 |
| 2013/0179844 A1* | 7/2013 | Mandic | G06F 3/0416 715/863 |
| 2013/0293572 A1* | 11/2013 | Kodimer | G06F 3/04883 345/629 |
| 2013/0339909 A1* | 12/2013 | Ha | G06F 3/017 715/863 |
| 2014/0033140 A1* | 1/2014 | Zeng | G06F 3/0488 715/863 |
| 2014/0123036 A1* | 5/2014 | Bao | G06F 3/0488 715/760 |
| 2014/0168139 A1* | 6/2014 | Ku | G09G 3/20 345/174 |
| 2014/0237408 A1* | 8/2014 | Ohlsson | G06F 3/0416 715/769 |
| 2014/0258904 A1* | 9/2014 | Ku | G06F 3/0485 715/769 |
| 2014/0282283 A1* | 9/2014 | Glebocki | G06F 3/04815 715/863 |
| 2015/0052477 A1* | 2/2015 | Yim | G06F 3/04847 715/800 |
| 2015/0234518 A1* | 8/2015 | Teller | G06F 3/0414 345/173 |
| 2015/0286302 A1* | 10/2015 | Kim | H01H 13/705 345/173 |

FOREIGN PATENT DOCUMENTS

| JP | 2012027875 | 2/2012 |
|---|---|---|
| JP | 2013045173 | 3/2013 |
| KR | 1020090011686 | 2/2009 |
| KR | 1020090103183 | 10/2009 |
| KR | 1020110086502 | 7/2011 |

OTHER PUBLICATIONS

Corresponding Office Action issued by the KIPO dated Aug. 21, 2015.

* cited by examiner

SINGLE TOUCH

SYSTEM AND METHOD FOR CONTROLLING OBJECT MOTION BASED ON TOUCH

CROSS REFERENCE TO RELATED APPLICATIONS

Priority is claimed under 35 U.S.C. § 119 to the following foreign patent applications:
Korean Patent Application No.: 10-2013-0149946, filed Dec. 4, 2013;
Korean Patent Application No.: 10-2013-0152493, filed Dec. 9, 2013;
Korean Patent Application No.: 10-2014-0032862, filed Mar. 20, 2014;
Korean Patent Application No.: 10-2014-0034169, filed Mar. 24, 2014;
Korean Patent Application No.: 10-2014-0055732, filed May 9, 2014;
Korean Patent Application No.: 10-2014-0098917, filed Aug. 1, 2014;
Korean Patent Application No.: 10-2014-0124920, filed Sep. 19, 2014; and
Korean Patent Application No.: 10-2014-0145022, filed Oct. 24, 2014.

The disclosures of the aforementioned priority applications are incorporated herein by reference in their entireties.

FIELD OF THE INVENTION

The present invention relates to a system and method for controlling an object action based on a first touch and a second touch, and more particularly to a system and method for distinguishing an action due to the first touch from an action due to the second touch and for controlling different object actions based on the first and second touches.

BACKGROUND OF THE INVENTION

Today, a variety of input-output devices are attached to electronic systems like a TV, a smartphone, an MP3 player, a PMP, a laptop computer, a PDA, etc. The various input-output devices are provided so as to allow a user to conveniently control the above systems. Since the smartphone, MP3 player, PMP, laptop computer, and PDA, etc., have a smaller size, there is a limit to attach the input-output devices. Therefore, a touch panel, a touch screen, a navigation pad, etc., are being increasingly attached as part of an effort to improve a user interface. Also, an integrated computer and tablet computer adopting the touch screen are distributed, so that there is a demand for various types of user interfaces.

It is possible to replace the mouse and keyboard in a common PC with the touch screen and to allow the user to input data and command in various ways even in a small space. However, despite the various user interfaces, the input through the devices has many limits, and thus, the user may feel inconvenient as much. For example, it is difficult to more accurately operate only by touching, so that problems occur in games or web surfing.

Here, the publication of Korean Patent Application No. 2011-0069983 discloses a user interface which calculates the touch time period of the touch input and controls the application execution speed. However, this just corresponds to the touch time period and is not able to correspond to various inputs such as touch intensity, area and/or time period of the touch.

SUMMARY OF THE INVENTION

One embodiment is a method for controlling an object action which is performed by an object action control system and is based on a single touch and multiple touches. The method includes: recognizing a touch on a touch panel by at least one input means; sensing at least one of a pressure magnitude, area and time period of the touch and determining whether the touch is the single touch or multiple touches which occur within a predetermined time period; and performing an action of one object in accordance with the single touch or multiple touches based on the determination result in conformity with a predetermined action standard.

The performing the action according to the single touch or multiple touches includes: performing a first action of the object according to the single touch; and performing a second action different from the first action of the object according to the multiple touches.

The performing the action according to the single touch or multiple touches includes stopping the performance of the first action and the second action when it is determined that at least one of the touch pressure magnitude, touch area and touch time period due to the single touch or multiple touch is not maintained as a result of sensing at least one of the touch pressure magnitude, touch area and touch time period.

The performing the action according to the single touch or multiple touches further includes: when the single touch or multiple touches are sensed after the first action or the second action is stopped, performing again the first action or the second action of the object.

When the at least one input means satisfies at least one of a touch pressure magnitude, touch area and touch time period of a first predetermined condition and touches the touch panel once within the predetermined time period, the touch is recognized as the single touch. When the at least one input means inputs the touch twice on the touch panel within the predetermined time period, including a first touch which satisfies at least one of a touch pressure magnitude, touch area and touch time period of a second predetermined condition different from the first predetermined condition and a second touch which satisfies at least one of the same touch pressure magnitude, touch area and touch time period as those of the first predetermined condition, the touch is recognized as the multiple touches.

The performing the action according to the single touch or multiple touches further includes: when at least one of the touch pressure magnitude and touch area is changed at the time of the single touch or the second touch of the multiple touches, changing a condition for performing the action.

Another embodiment is an object action control system which performs a method for controlling the object action on the basis of a touch. The system includes: a touch panel; a touch sensing module which recognizes a single touch or multiple touches on the touch panel by at least one input means; a change sensing module which senses at least any one of a pressure magnitude, area and time period of the touch on the touch panel by the input means which has applied the single touch and multiple touches; and an action module which performs different actions of one object in accordance with the single touch or multiple touches in conformity with a predetermined action standard.

The action module performs a first action of the object according to the single touch, and performs a second action different from the first action of the object according to the multiple touches.

When the at least one input means satisfies at least one of a touch pressure magnitude, touch area and touch time period of a first predetermined condition and touches the touch panel once within the predetermined time period, the touch is recognized as the single touch. When the at least one input means inputs the touch twice on the touch panel within the predetermined time period, including a first touch which satisfies at least one of a touch pressure magnitude, touch area and touch time period of a second predetermined condition different from the first predetermined condition and a second touch which satisfies at least one of the same touch pressure magnitude, touch area and touch time period as those of the first predetermined condition, the touch is recognized as the multiple touches.

The action module changes a condition for performing the action when at least one of the touch pressure magnitude and touch area is changed at the time of the single touch or the second touch of the multiple touches.

DETAILED DESCRIPTION OF THE INVENTION

Figure 1:
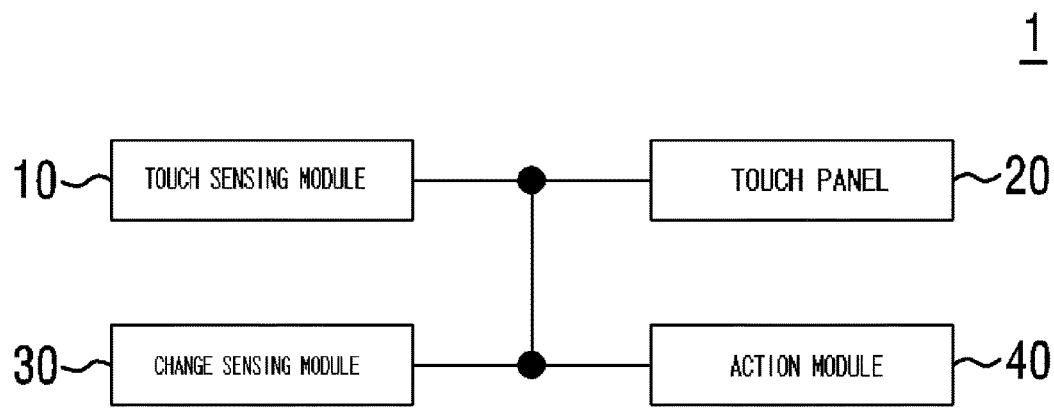
FIG. 1 shows an object action control system according to an embodiment of the present invention.

Specific structural or functional descriptions of the embodiments disclosed in this specification of the present invention are just proposed for description of the embodiments according to the present invention. The embodiments according to the present invention can be variously provided and should not be construed to limit the embodiments described in this specification.

As the embodiment of the present invention can have various embodiments as well as can be diversely changed, specific embodiments will be illustrated in the drawings and described in detail in the present specification. While the embodiment according to the concept of the present invention is not limited to particular embodiments, all modification, equivalents and substitutes included in the spirit and scope of the present invention are understood to be included therein. In the drawings, similar reference numerals are used to designate similar components.

While terms such as the first and the second, etc., can be used to describe various components, the components are not limited by the terms mentioned above. The terms are used only for distinguishing between one component and other components. For example, the first component may be designated as the second component without departing from the scope of rights according to the concept of the present invention. Similarly, the second component may be designated as the first component.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween. Expressions describing the relationship between the components, that is, "between ~", and "directly between ~" or "adjacent to ~" and "directly adjacent to ~" and the like should be construed in the same way.

Terms used in the present specification are provided for description of only specific embodiments of the present invention, and not intended to be limiting. An expression of a singular form includes the expression of plural form thereof unless otherwise explicitly mentioned in the context. In the present specification, it should be understood that the term "include" or "comprise" and the like is intended to specify characteristics, numbers, steps, operations, components, parts or any combination thereof which are mentioned in the specification, and intended not to previously exclude the possibility of existence or addition of at least one another characteristics, numbers, steps, operations, components, parts or any combination thereof.

Unless differently defined, all terms used herein including technical and scientific terms have the same meaning as commonly understood by one of ordinary skill in the art to which the present invention belongs. Terms, for example, commonly used terms defined in the dictionary, are to be construed to have exactly the same meaning as that of related technology in the context. As long as terms are not clearly defined in the present application, the terms should not be ideally or excessively construed as formal meaning.

Hereafter, the present invention will be described in detail by describing the preferred embodiments of the present invention with reference to the accompanying drawings. The same reference numerals shown in the drawings indicate the same members.

Hereafter, an action control system 1 including a touch panel 20 according to an embodiment of the present invention will be described with reference to the accompanying drawings. Prior to the description of the functions and features of the action control system 1 according to the embodiment of the present invention, the touch panel 20 included in the action control system 1 will be described in detail with reference to FIGS. 9 to 17.

Figure 9:
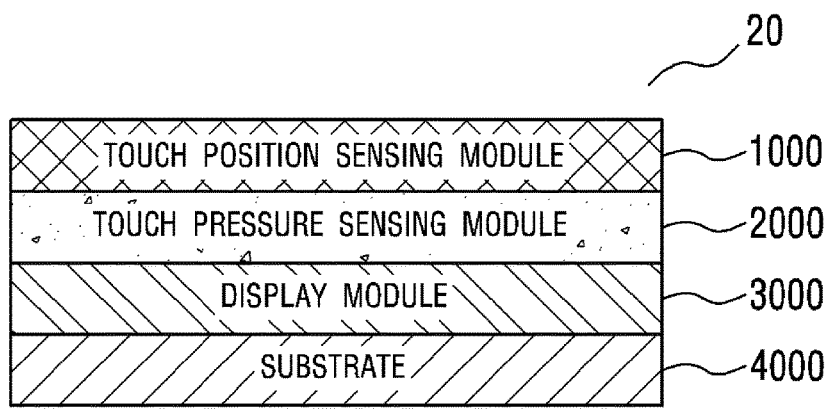
FIG. 9 is a structure view of a touch panel according to a first embodiment.

FIG. 9 is a structure view of the touch panel according to a first embodiment.

As shown in FIG. 9, the touch panel 20 may include a touch position sensing module 1000, a touch pressure sensing module 2000 disposed under the touch position sensing module 1000, a display module 3000 disposed under the touch pressure sensing module 2000, and a substrate 4000 disposed under the display module 3000. For example, the touch position sensing module 1000 and the touch pressure sensing module 2000 may be a transparent panel including a touch-sensitive surface. Hereafter, the modules 1000, 2000, 3000 and 5000 for sensing the touch position and/or touch pressure may be collectively designated as a touch sensing module.

The display module 3000 may display in such a manner as to allow a user to visually check contents. Here, the display module 3000 may display by means of a display driver. The display driver (not shown) is a software allowing an operating system to manage or control a display adaptor and is a kind of a device driver.

Figure 17A:
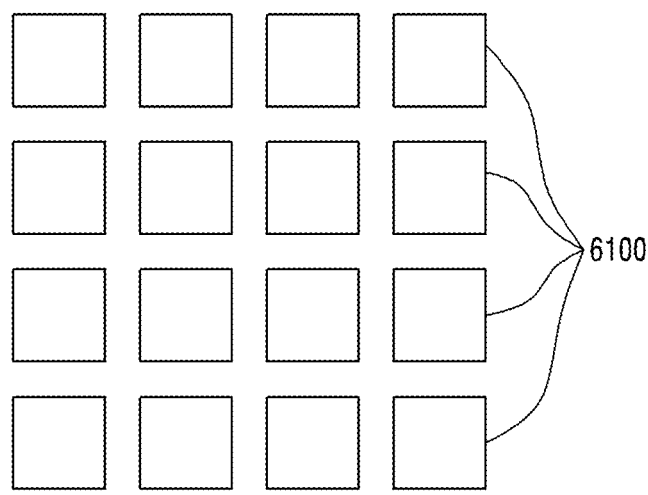
FIGS. 17a to 17d are structure views showing the shape of an electrode formed on the touch sensing module according to the embodiment.
Figure 17B:
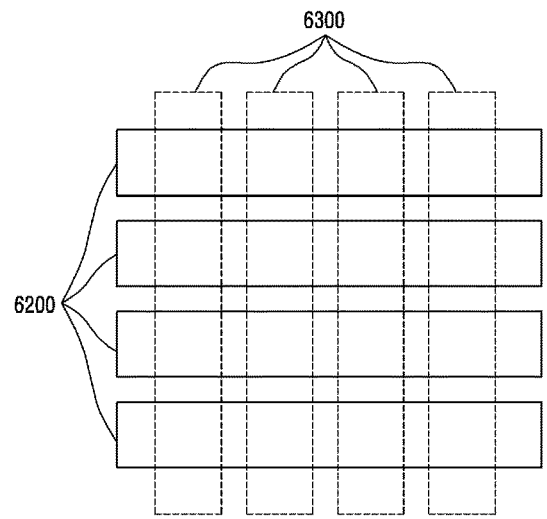
Figure 17C:
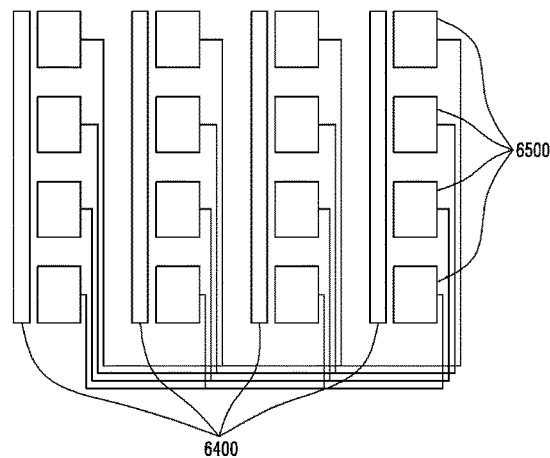

FIGS. 10a to 10d show a structure of a touch position sensing module according to the first embodiment. FIGS. 17a to 17c are structure views showing the shape of an electrode formed in the touch sensing module according to the embodiment.

Figure 10A:
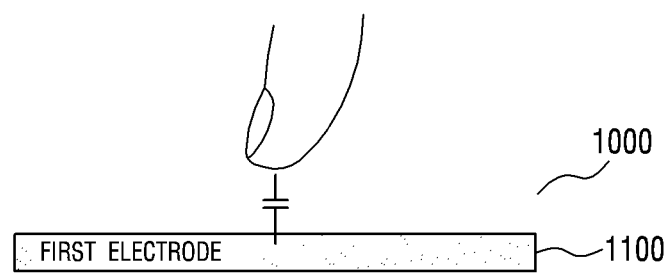
FIGS. 10a to 10d are structure views of a touch position sensing module of the touch panel according to the first embodiment.

As shown in FIG. 10a, the touch position sensing module 1000 according to the embodiment may include a first electrode 1100 formed in one layer. Here, the first electrode 1100 may be, as shown in FIG. 17a, comprised of a plurality of electrodes 6100, and then a driving signal may be input to each electrode 6100 and a sensing signal including information on self-capacitance may be output from each electrode. When an input means like a user's finger approaches the first electrode 1100, the finger functions as a ground and the self-capacitance of first electrode 1100 is changed. Therefore, the action control system 1 is able to detect the touch position by measuring the self-capacitance of the first electrode 1100, which is changed as the input means like the user's finger approaches the touch panel 20.

Figure 10B:
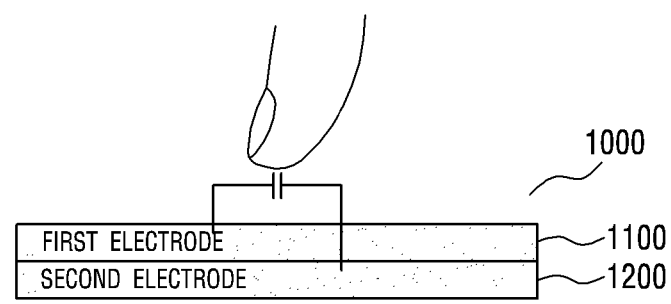

As shown in FIG. 10b, the touch position sensing module 1000 according to the embodiment may include the first electrode 1100 and a second electrode 1200, which are formed on different layers.

Figure 10C:
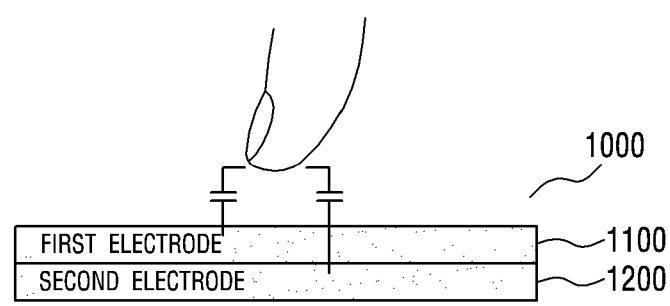

Here, the first and the second electrodes 1100 and 1200 are, as shown in FIG. 17b, comprised of a plurality of first electrodes 6200 and a plurality of second electrodes 6300 respectively. The plurality of first electrodes 6200 and the plurality of second electrodes 6300 may be arranged to cross each other. A driving signal may be input to any one of the first electrode 6200 and the second electrode 6300, and a sensing signal including information on mutual capacitance may be output from the other. As shown in FIG. 10b, when the input means like the user's finger approaches the first electrode 1100 and the second electrode 1200, the finger functions as a ground, so that the mutual capacitance between the first electrode 1100 and the second electrode 1200 is changed. In this case, the action control system 1 measures the mutual capacitance between the first electrode 1100 and the second electrode 1200, which is changed with the approach of the object like the user's finger to the touch panel 20, and then detects the touch position. Also, the driving signal may be input to the first electrode 6200 and the second electrode 6300, and a sensing signal including information on the self-capacitance may be output from the first and second electrodes 6200 and 6300 respectively. As shown in FIG. 10c, when the object like the user's finger approaches the first electrode 1100 and the second electrode 1200, the finger functions as a ground, so that the self-capacitance of each of the first and second electrodes 1100 and 1200 is changed. In this case, the action control system 1 measures the self-capacitances of the first electrode 1100 and the second electrode 1200, which is changed with the approach of the object like the user's finger to the touch panel 20, and then detects the touch position.

Figure 10D:
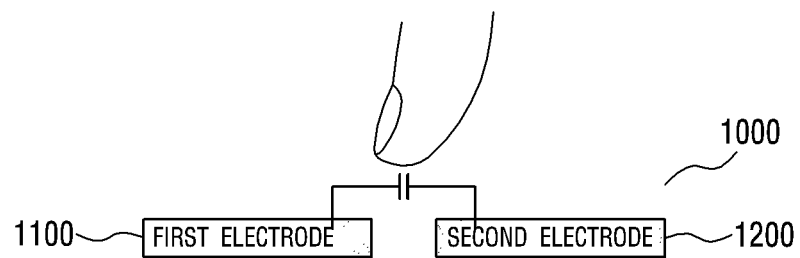

As shown in FIG. 10d, the touch position sensing module 1000 according to the embodiment may include the first electrode 1100 formed in one layer and the second electrode 1200 formed in the same layer as the layer in which the first electrode 1100 has been formed.

Here, the first and the second electrodes 1100 and 1200 are, as shown in FIG. 17c, comprised of a plurality of first electrodes 6400 and a plurality of second electrodes 6500 respectively. The plurality of first electrodes 6400 and the plurality of second electrodes 6500 may be arranged without crossing each other and may be arranged such that the plurality of second electrodes 6500 are connected to each other in a direction crossing the extension direction of the each first electrodes 6400. A principle of detecting the touch position by using the first electrode 6400 or the second electrode 6500 shown in FIG. 10d is the same as that of the foregoing referring to FIG. 10c, and thus a description of the principle will be omitted.

FIGS. 11a to 11f show a structure of the touch pressure sensing module according to the first embodiment. FIGS. 17a to 17d are structure views showing the shape of the electrode formed in the touch pressure sensing module 2000 according to the embodiment.

As shown in FIGS. 11a to 11f, the touch pressure sensing module 2000 according to the first embodiment may include a spacer layer 2400. The spacer layer 2400 may be implemented by an air gap. The spacer may be comprised of an impact absorbing material according to the embodiment and may be also filled with a dielectric material according to the embodiment.

As shown in FIGS. 11a to 11d, the touch pressure sensing module 2000 according to the first embodiment may include a reference potential layer 2500. The reference potential layer 2500 may have any potential. For example, the reference potential layer may be a ground layer having a ground potential. Here, the reference potential layer may include a layer which is parallel with a two-dimensional plane in which a below-described first electrode 2100 for sensing the touch pressure has been formed or a two-dimensional plane in which a below-described second electrode 2200 for sensing the touch pressure has been formed. Although it has been described in FIGS. 11a to 11d that the touch pressure sensing module 2000 includes the reference potential layer 2500, there is no limit to this. The touch pressure sensing module 2000 does not include the reference potential layer 2500, and the display module 3000 or the substrate 4000 which is disposed under the touch pressure sensing module 2000 may function as the reference potential layer.

Figure 11A:
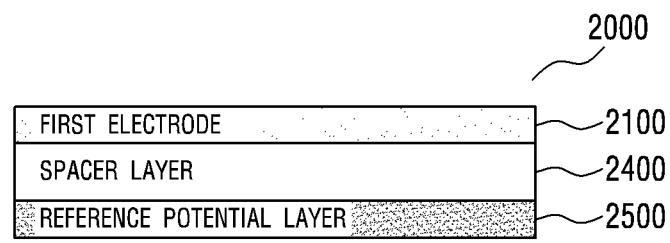
FIGS. 11a to 11f are structure views of a touch pressure sensing module of the touch panel according to the first embodiment.

As shown in FIG. 11a, the touch pressure sensing module 2000 according to the embodiment may include the first electrode 2100 formed in one layer, the spacer layer 2400 formed under the layer in which the first electrode 2100 has been formed, and the reference potential layer 2500 formed under the spacer layer 2400.

Figure 11B:
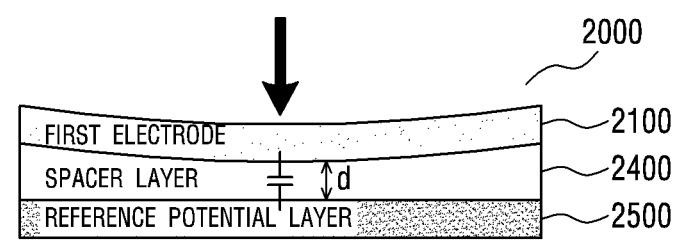
Figure 17D:
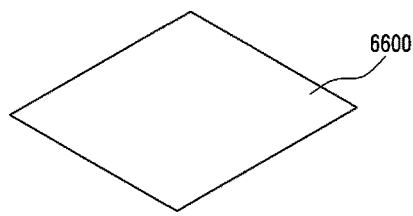

Here, the first electrode 2100 is, as shown in FIG. 17a, comprised of the plurality of electrodes 6100. Then, the driving signal may be input to each of the electrodes 6100 and the sensing signal including information on the self-capacitance may be output from the each electrode. When a pressure is applied to the touch panel 20 by the object like the user's finger or stylus, the first electrode 2100 is, as shown in FIG. 11b, curved at least at the touch position, so that a distance "d" between the first electrode 2100 and the reference potential layer 2500 is changed, and thus, the self-capacitance of the first electrode 2100 is changed. Accordingly, the action control system 1 is able to detect the touch pressure by measuring the self-capacitance of the first electrode 2100, which is changed by the pressure that the object like the user's finger or stylus applies to the touch panel 20. As such, since the first electrode 2100 is comprised of the plurality of electrodes 6100, the action control system 1 is able to detect the pressure of each of multiple touches which have been simultaneously input to the touch panel 20. Also, when there is no requirement for detecting the pressure of each of multiple touches, it is only required to detect overall pressure applied to the touch panel 20 irrespective of the touch position. Therefore, the first electrode 2100 of the touch pressure sensing module 2000 may be, as shown in FIG. 17d, comprised of one electrode 6600.

Figure 11C:
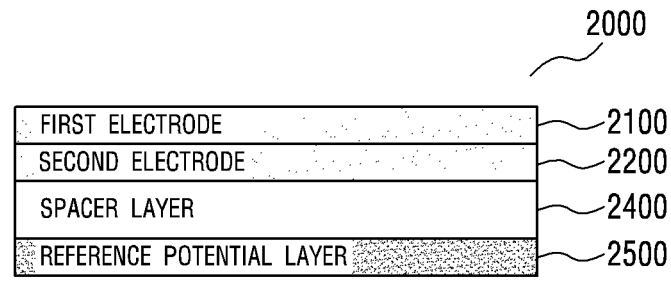

As shown in FIG. 11c, the touch pressure sensing module 2000 according to the embodiment may include the first electrode 2100, the second electrode 2200 formed under the layer in which the first electrode 2100 has been formed, the spacer layer 2400 formed under the layer in which the second electrode 2200 has been formed, and the reference potential layer 2500 formed under the spacer layer 2400.

Figure 11D:
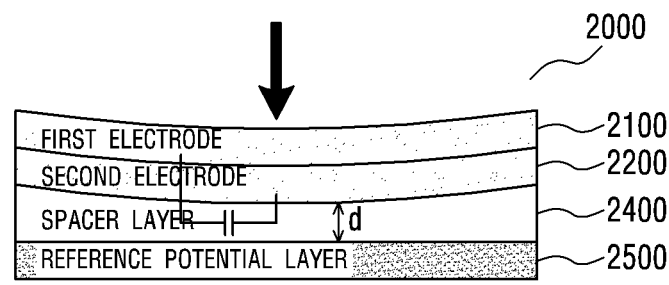

Here, the first electrode 2100 and the second electrode 2200 may be configured and arranged as shown in FIG. 17b. A driving signal is input to any one of the first electrode 6200 and the second electrode 6300, and a sensing signal including information on the mutual capacitance may be output from the other. When a pressure is applied to the touch panel 20, the first electrode 2100 and the second electrode 2200 are, as shown in FIG. 11d, curved at least at the touch position, so that a distance "d" between the reference potential layer 2500 and both the first electrode 2100 and the second electrode 2200 is changed, and thus, the mutual capacitance between the first electrode 2100 and the second electrode 2200 is changed. Accordingly, the action control system 1 is able to detect the touch pressure by measuring the mutual capacitance between the first electrode 2100 and the second electrode 2200, which is changed by the pressure that is applied to the touch panel 20. As such, since the first electrode 2100 and the second electrode 2200 are comprised of the plurality of first electrodes 6200 and the plurality of second electrodes 6300 respectively, the action control system 1 is able to detect the pressure of each of multiple touches which have been simultaneously input to the touch panel 20. Also, when there is no requirement for detecting the pressure of each of multiple touches, at least one of the first electrode 2100 and the second electrode 2200 of the touch pressure sensing module 2000 may be, as shown in FIG. 17d, comprised of the one electrode 6600.

Here, even when the first electrode 2100 and the second electrode 2200 are formed in the same layer, the touch pressure can be also detected as described in FIG. 11c. The first electrode 2100 and the second electrode 2200 may be configured and arranged as shown in FIG. 17c, or may be comprised of the one electrode 6600 as shown in FIG. 17d.

Figure 11E:
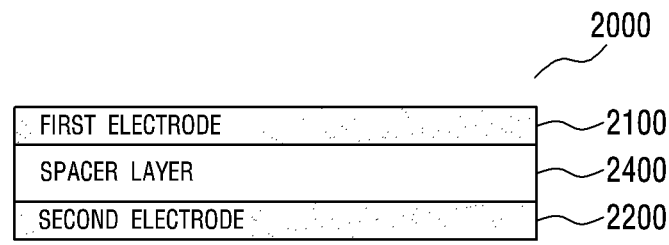

As shown in FIG. 11e, the touch pressure sensing module 2000 according to the embodiment may include the first electrode 2100 formed in one layer, the spacer layer 2400 formed under the layer in which the first electrode 2100 has been formed, and the second electrode 2200 formed under the spacer layer 2400.

Figure 11F:
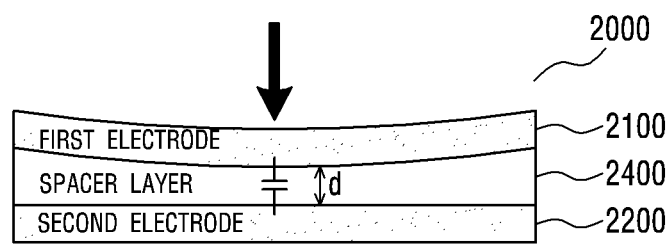

In FIG. 11e, the configuration and operation of the first electrode 2100 and the second electrode 2200 are the same as those of the foregoing referring to FIG. 11c, and thus, a description of the configuration and operation will be omitted. When a pressure is applied to the touch panel 20, the first electrode 2100 is, as shown in FIG. 11f, curved at least at the touch position, so that a distance "d" between the first electrode 2100 and the second electrode 2200 is changed, and thus, the mutual capacitance between the first electrode 2100 and the second electrode 2200 is changed. Accordingly, the action control system 1 is able to detect the touch pressure by measuring the mutual capacitance between the first electrode 2100 and the second electrode 2200.

Figure 12:
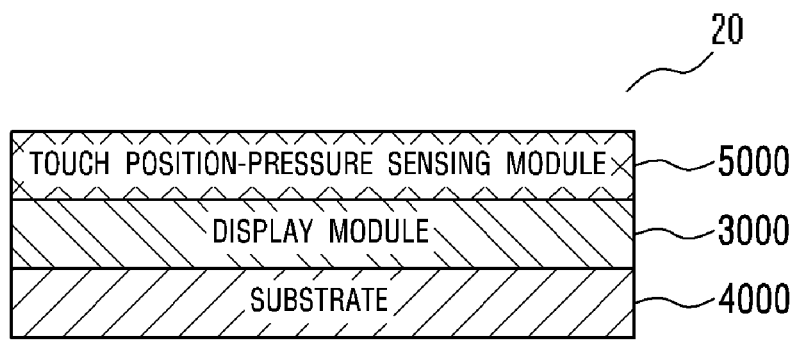
FIG. 12 is a structure view of a touch panel according to a second embodiment.

As shown in FIG. 12, a touch panel 20 according to a second embodiment may include a touch position-pressure sensing module 5000, a display module 3000 disposed under the touch position-pressure sensing module 5000, and a substrate 4000 disposed under the display module 3000.

Unlike the embodiment shown in FIG. 9, the touch position-pressure sensing module 5000 according to the embodiment shown in FIG. 12 includes at least one electrode for sensing the touch position, and at least one electrode for sensing the touch pressure. At least one of the electrodes is used to sense both the touch position and the touch pressure. As such, the electrode for sensing the touch position and the electrode for sensing the touch pressure are shared, so that it is possible to reduce the manufacturing cost of the touch position-pressure sensing module, to reduce the overall thickness of the touch panel 20 and to simplify the manufacturing process. In the sharing of the electrode for sensing the touch position and the electrode for sensing the touch pressure, when it is necessary to distinguish between the sensing signal including information on the touch position and the sensing signal including information on the touch pressure, it is possible to distinguish and sense the touch position and the touch pressure by differentiating a frequency of the driving signal for sensing the touch position from a frequency of the driving signal for sensing the touch pressure, or by differentiating a time interval for sensing the touch position from a time interval for sensing the touch pressure.

FIGS. 13a to 13k show a structure of the touch position-pressure sensing module according to the second embodiment. As shown in FIGS. 13a to 13k, the touch position-pressure sensing module 5000 according to the second embodiment may include a spacer layer 5400.

As shown in FIGS. 13a to 13i, the touch position-pressure sensing module 5000 according to the embodiment may include a reference potential layer 5500. The reference potential layer 5500 is the same as that of the foregoing referring to FIGS. 11a to 11d, and thus, a description of the reference potential layer 5500 will be omitted. The reference potential layer may include a layer which is parallel with a two-dimensional plane in which a below-described first electrode 5100 for sensing the touch pressure has been formed, a two-dimensional plane in which a below-described second electrode 5200 for sensing the touch pressure has been formed, or a two-dimensional plane in which a below-described third electrode 5300 for sensing the touch pressure has been formed.

Figure 13A:
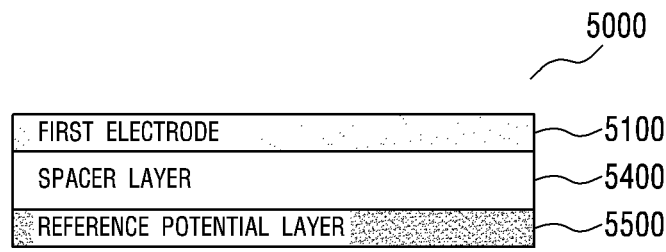
FIGS. 13a to 13k are structure views of a touch position-pressure sensing module of the touch panel according to the second embodiment.

As shown in FIG. 13a, the touch position-pressure sensing module 5000 according to the embodiment may include the first electrode 5100 formed in one layer, the spacer layer 5400 formed under the layer in which the first electrode 5100 has been formed, and the reference potential layer 5500 formed under the spacer layer 5400.

Figure 13B:
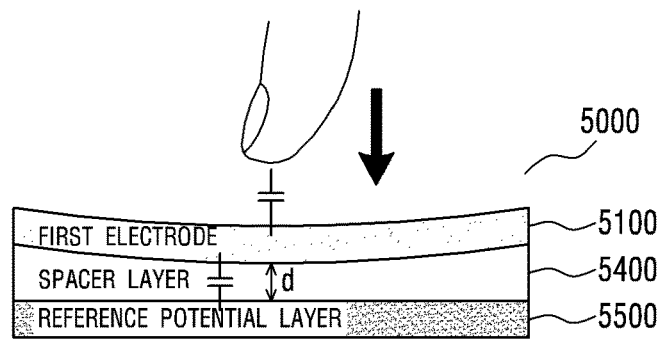

A description of the configuration of FIGS. 13a and 13b is similar to the description referring to FIGS. 11a and 11b. Hereafter, only the difference between them will be described. As shown in FIG. 13b, when the object like the user's finger approaches the first electrode 5100, the finger functions as a ground and the touch position can be detected by the change of the self-capacitance of the first electrode 5100. Also, when a pressure is applied to the touch panel 20 by the object, a distance "d" between the first electrode 5100 and the reference potential layer 5500 is changed, and thus, the touch pressure can be detected by the change of the self-capacitance of the first electrode 5100.

Figure 13C:
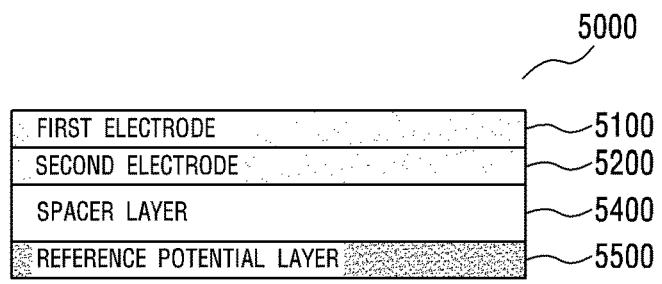

As shown in FIG. 13c, the touch position-pressure sensing module 5000 according to the embodiment may include the first electrode 5100 formed in one layer, the second electrode 5200 formed in a layer under the layer in which the first electrode 5100 has been formed, the spacer layer 5400 formed under the layer in which the second electrode 5200 has been formed, and the reference potential layer 5500 formed under the spacer layer 5400.

Figure 13D:
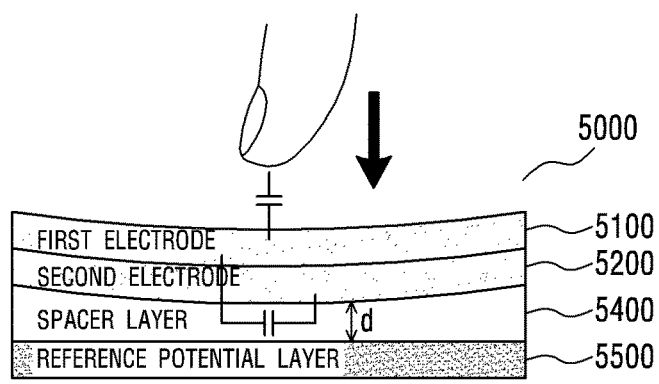

A description of the configuration of FIGS. 13c to 13f is similar to the description referring to FIGS. 11c and 11d. Hereafter, only the difference between them will be described. Here, the first electrode 5100 and the second electrode 5200 may be, as shown in FIG. 17a, comprised of the plurality of electrodes 6100 respectively. As shown in FIG. 13d, when the object like the user's finger approaches the first electrode 5100, the finger functions as a ground and the touch position can be detected by the change of the self-capacitance of the first electrode 5100. Also, when a pressure is applied to the touch panel 20 by the object, a distance "d" between the reference potential layer 5500 and both the first electrode 5100 and the second electrode 5200 is changed, and thus, the touch pressure can be detected by the change of the mutual capacitance between the first electrode 5100 and the second electrode 5200.

Also, according to the embodiment, each of the first and second electrodes 5100 and 5200 may be, as shown in FIG. 17b, comprised of the plurality of first electrodes 6200 and the plurality of second electrodes 6300. The plurality of first electrodes 6200 and the plurality of second electrodes 6300 may be arranged to cross each other. Here, the touch position can be detected by the change of the mutual capacitance between the first electrode 5100 and the second electrode 5200, and the touch pressure can be detected by the change of the self-capacitance of the second electrode 5200 according to the change of a distance "d" between the second electrode 5200 and the reference potential layer 5500. Also, according to the embodiment, the touch position can be detected by the change of the mutual capacitance between the first electrode 5100 and the second electrode 5200, and also, the touch pressure can be detected by the change of the mutual capacitance between the first electrode 5100 and the second electrode 5200 according to the change of the distance "d" between the reference potential layer 5500 and both the first electrode 5100 and the second electrode 5200.

Here, even when the first electrode 5100 and the second electrode 5200 are formed in the same layer, the touch position and touch pressure can be also detected as described with reference to FIGS. 13c and 13d. However, in FIGS. 13c and 13d, regarding the embodiment where the electrode should be configured as shown in FIG. 17b, when the first electrode 5100 and the second electrode 5200 are formed in the same layer, the first electrode 5100 and the second electrode 5200 may be configured as shown in FIG. 17c.

Figure 13E:
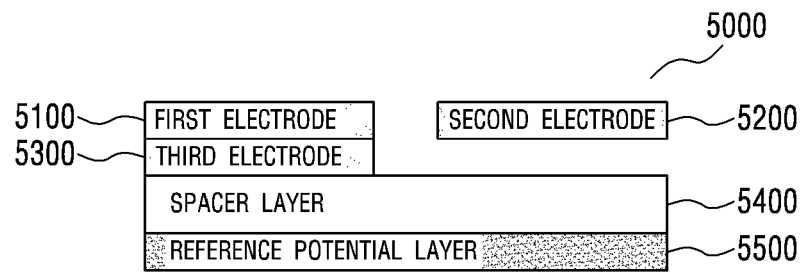

As shown in FIG. 13e, the touch position-pressure sensing module 5000 according to the embodiment may include the first electrode 5100 and the second electrode 5200 which have been in the same layer, the third electrode 5300 which has been formed in a layer under the layer in which the first electrode 5100 and the second electrode 5200 have been formed, the spacer layer 5400 formed under the layer in which the third electrode 5300 has been formed, and the reference potential layer 5500 formed under the spacer layer 5400.

Figure 13F:
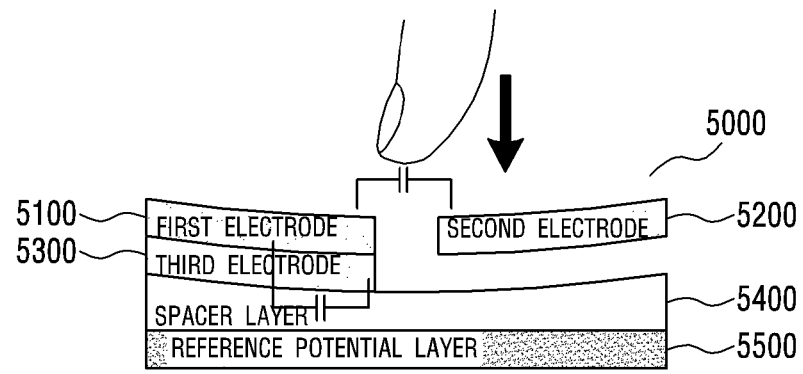

Here, the first electrode 5100 and the second electrode 5200 may be configured and arranged as shown in FIG. 17c, and the first electrode 5100 and the third electrode 5300 may be configured and arranged as shown in FIG. 17b. As shown in FIG. 13f, when the object like the user's finger approaches the first electrode 5100 and the second electrode 5200, the mutual capacitance between the first electrode 5100 and the second electrode 5200 is changed, so that the touch position can be detected. When a pressure is applied to the touch panel 20 by the object, a distance "d" between the reference potential layer 5500 and both the first electrode 5100 and the third electrode 5300 is changed, and then the mutual capacitance between the first electrode 5100 and the third electrode 5300 is hereby changed, so that the touch pressure can be detected. Also, according to the embodiment, the touch position can be detected by the change of the mutual capacitance between the first electrode 5100 and the third electrode 5300, and the touch pressure can be detected by the change of the mutual capacitance between the first electrode 5100 and the second electrode 5200.

Figure 13G:
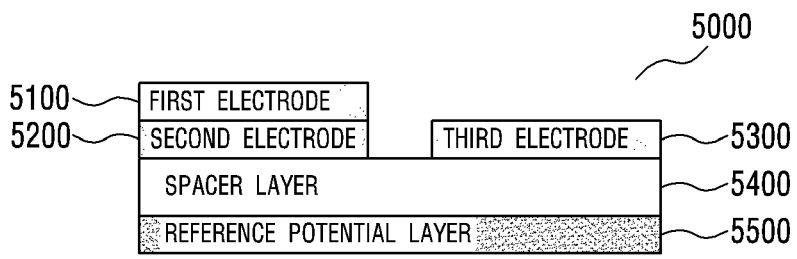

As shown in FIG. 13g, the touch position-pressure sensing module 5000 according to the embodiment may include the first electrode 5100 formed in one layer, the second electrode 5200 formed in a layer under the layer in which the first electrode 5100 has been formed, the third electrode 5300 formed in the same layer as the layer in which the second electrode 5200 has been formed, the spacer layer 5400 formed under the layer in which the second electrode 5200 and the third electrode 5300 have been formed, and the reference potential layer 5500 formed under the spacer layer 5400.

Figure 13H:
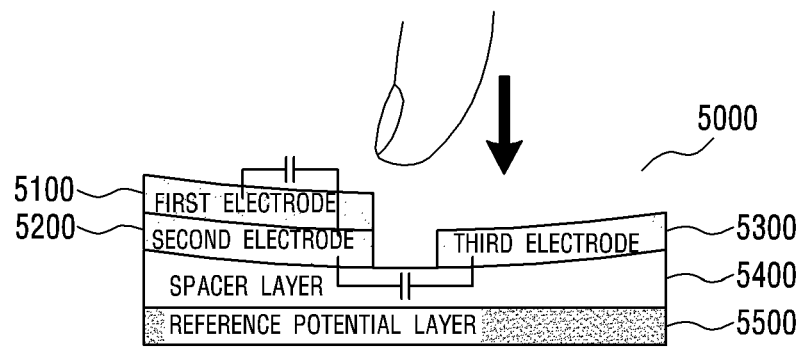

Here, the first electrode 5100 and the second electrode 5200 may be configured and arranged as shown in FIG. 17b, and the second electrode 5200 and the third electrode 5300 may be configured and arranged as shown in FIG. 17c. In FIG. 13h, the touch position can be detected by the change of the mutual capacitance between the first electrode 5100 and the second electrode 5200, and the touch pressure can be detected by the change of the mutual capacitance between the second electrode 5200 and the third electrode 5300. Also, according to the embodiment, the touch position can be detected by the change of the mutual capacitance between the first electrode 5100 and the third electrode 5300, and the touch pressure can be detected by the change of the mutual capacitance between the first electrode 5100 and the second electrode 5200.

Figure 13I:
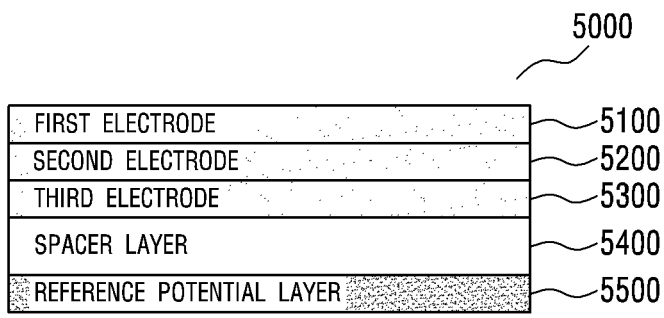

As shown in FIG. 13i, the touch position-pressure sensing module 5000 according to the embodiment may include the first electrode 5100 formed in one layer, the second electrode 5200 formed in a layer under the layer in which the first electrode 5100 has been formed, the third electrode 5300 formed under the layer in which the second electrode 5200 has been formed, the spacer layer 5400 formed under the layer in which the third electrode 5300 has been formed, and the reference potential layer 5500 formed under the spacer layer 5400.

Here, the first electrode 5100 and the second electrode 5200 may be configured and arranged as shown in FIG. 17b, and the second electrode 5200 and the third electrode 5300 may be also configured and arranged as shown in FIG. 17b. Here, when the object like the user's finger approaches the first electrode 5100 and the second electrode 5200, the finger functions as a ground and the touch position can be detected by the change of the mutual capacitance between the first electrode 5100 and the second electrode 5200. Also, when a pressure is applied to the touch panel 20 by the object, a distance "d" between the reference potential layer 5500 and both the second electrode 5200 and the third electrode 5300 is changed, so that the touch pressure can be detected by the change of the mutual capacitance between the second electrode 5200 and the third electrode 5300. Also, according to the embodiment, when the object like the user's finger approaches the first electrode 5100 and the second electrode 5200, the finger functions as a ground, so that the touch position can be detected by the change of the self-capacitance of each of the first and second electrodes 5100 and 5200.

Figure 13J:
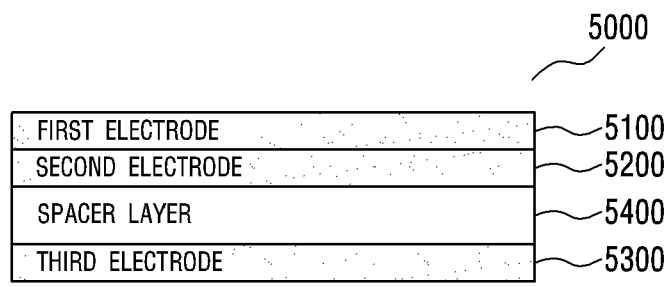

As shown in FIG. 13j, the touch position-pressure sensing module 5000 according to the embodiment may include the first electrode 5100 formed in one layer, the second electrode 5200 formed in a layer under the layer in which the first electrode 5100 has been formed, the spacer layer 5400 formed under the layer in which the second electrode 5200 has been formed, and the third electrode 5300 formed under the spacer layer 5400.

Here, the first electrode 5100 and the second electrode 5200 may be configured and arranged as shown in FIG. 17b, and the third electrode 5300 may be configured as shown in FIG. 17a or the second electrode 5200 and the third electrode 5300 may be also configured and arranged as shown in FIG. 17b. Here, when the object like the user's finger approaches the first electrode 5100 and the second electrode 5200, the finger functions as a ground and the touch position can be detected by the change of the mutual capacitance between the first electrode 5100 and the second electrode 5200. Also, when a pressure is applied to the touch panel 20 by the object, a distance "d" between the second electrode 5200 and the third electrode 5300 is changed, so that the touch pressure can be detected by the change of the mutual capacitance between the second electrode 5200 and the third electrode 5300. Also, according to the embodiment, when the object like the user's finger approaches the first electrode 5100 and the second electrode 5200, the finger functions as a ground, so that the touch position can be detected by the change of the self-capacitance of each of the first and second electrodes 5100 and 5200.

Figure 13K:

As shown in FIG. 13k, the touch position-pressure sensing module 5000 according to the embodiment may include the first electrode 5100 formed in one layer, the spacer layer 5400 formed under the layer in which the first electrode 5100 has been formed, and the second electrode 5200 formed under the spacer layer 5400.

Here, the first electrode 5100 and the second electrode 5200 may be configured and arranged as shown in FIG. 17b. Here, the touch position can be detected by the change of the mutual capacitance between the first electrode 5100 and the second electrode 5200. Also, when a pressure is applied to the touch panel 20 by the object, a distance "d" between the first electrode 5100 and the second electrode 5200 is changed, so that the touch pressure can be detected by the change of the mutual capacitance between the first electrode 5100 and the second electrode 5200. The first electrode 5100 and the second electrode 5200 may be configured and arranged as shown in FIG. 17a. Here, when the object like the user's finger approaches the first electrode 5100, the finger functions as a ground and the self-capacitance of the first electrode 5100 is changed, so that the touch position can be detected. Also, the touch pressure can be detected by the change of the mutual capacitance between the first electrode 5100 and the second electrode 5200.

Figure 14:
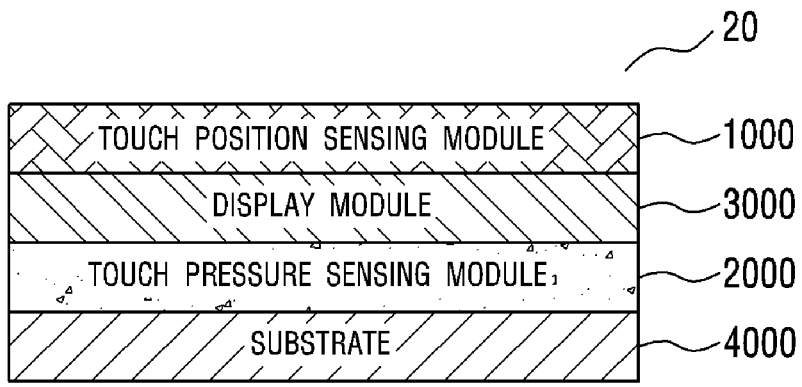
FIG. 14 is a structure view of a touch panel according to a third embodiment.

As shown in FIG. 14, a touch panel 20 according to a third embodiment may include the touch position sensing module 1000, the display module 3000 disposed under the touch position sensing module 1000, the touch pressure sensing module 2000 disposed under the display module 3000, and the substrate 4000 disposed under the touch pressure sensing module 2000.

In the touch panels 20 according to the embodiment shown in FIGS. 9 and 12, since the touch pressure sensing module 2000 which includes the spacer layer 2400 or the touch position-pressure sensing module 5000 which includes the spacer layer 5400 is disposed on the display module 3000, the color clarity, visibility, optical transmittance of the display module 3000 may be reduced. Therefore, in order to prevent such problems, the touch position sensing module 1000 and the display module 3000 are fully laminated by using an adhesive like an optically clear adhesive (OCA), and the touch pressure sensing module 2000 is disposed under the display module 3000. As a result, the aforementioned problem can be alleviated and solved. Also, an existing gap formed between the display module 3000 and the substrate 4000 is used as the spacer layer for detecting the touch pressure, so that the overall thickness of the touch panel 20 can be reduced.

The touch position sensing module 1000 according to the embodiment shown in FIG. 14 is the same as the touch position sensing module shown in FIGS. 10a to 10d.

Figure 15A:
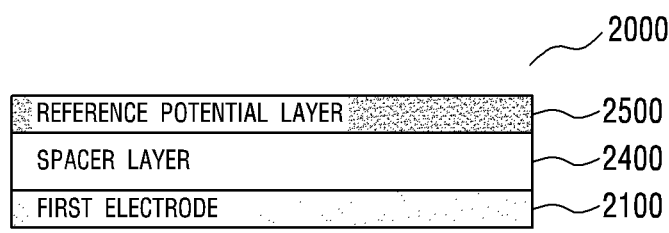
FIGS. 15a to 15b show a touch pressure sensing module of the touch panel according to the third embodiment.
Figure 15B:
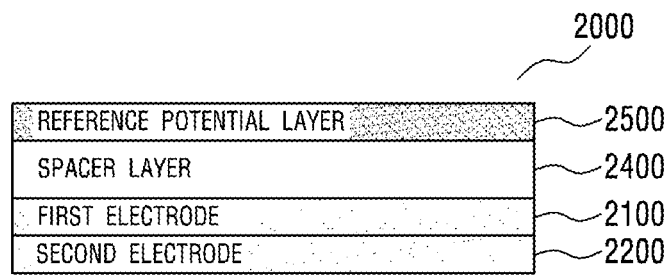

The touch pressure sensing module 2000 according to the embodiment shown in FIG. 14 may be the touch pressure sensing module shown in FIGS. 11a to 11f and the touch pressure sensing module shown in FIGS. 15a to 15b.

As shown in FIG. 15a, the touch pressure sensing module 2000 according to the embodiment may include the reference potential layer 2500, the spacer layer 2400 formed under the reference potential layer 2500, and the first electrode 2100 formed under the spacer layer 2400. Since the configuration and operation of FIG. 15a are the same as those of FIGS. 11a and 11b with the exception of the fact that the position of the reference potential layer 2500 and the position of the first electrode 2100 are replaced with each other, repetitive descriptions thereof will be omitted hereafter.

As shown in FIG. 15b, the touch pressure sensing module 2000 according to the embodiment may include the reference potential layer 2500, the spacer layer 2400 formed under the ground, the first electrode 2100 formed in a layer under the spacer layer 2400, and the second electrode 2200 formed in a layer under the layer in which the first electrode 2100 has been formed. Since the configuration and operation of FIG. 15b are the same as those of FIGS. 11c and 11d with the exception of the fact that the position of the reference potential layer 2500, the position of the first electrode 2100 and the position of the second electrode 2200 are replaced with each other, repetitive descriptions thereof will be omitted hereafter. Here, even when the first electrode 2100 and the second electrode 2200 are formed in the same layer, the touch pressure can be detected as described in FIGS. 11c and 11d.

Although it has been described in FIG. 14 that the display module 3000 is disposed under the touch position sensing module 1000, the touch position sensing module 1000 can be included within the display module 3000. Also, although it has been described in FIG. 14 that the touch pressure sensing module 2000 is disposed under the display module 3000, a portion of the touch pressure sensing module 2000 can be included within the display module 3000. Specifically, the reference potential layer 2500 of the touch pressure sensing module 2000 may be disposed within the display module 3000, and the electrodes 2100 and 2200 may be formed under the display module 3000. As such, when the reference potential layer 2500 is disposed within the display module 3000, a gap formed within the display module 3000 is used as the spacer layer for detecting the touch pressure, so that the overall thickness of the touch panel 20 can be reduced. Here, the electrodes 2100 and 2200 may be formed on the substrate 4000. As such, when the electrodes 2100 and 2200 are formed on the substrate 4000, not only the gap formed within the display module 3000 but also the gap formed between the display module 3000 and the substrate 4000 is used as the spacer layer for detecting the touch pressure, so that the sensitivity for detecting the touch pressure can be more improved.

Figure 16A:
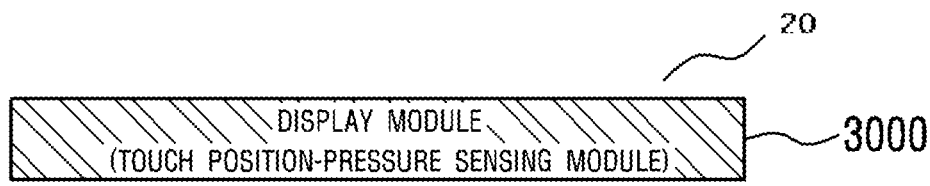
FIG. 16a is a structure view of a touch panel according to a fourth embodiment.

FIG. 16a shows a structure of the touch panel 20 according to a fourth embodiment. As shown in FIG. 16a, the touch panel 20 according to the fourth embodiment may include at least one of the touch position sensing module and the touch pressure sensing module within the display module 3000.

Figure 16B:
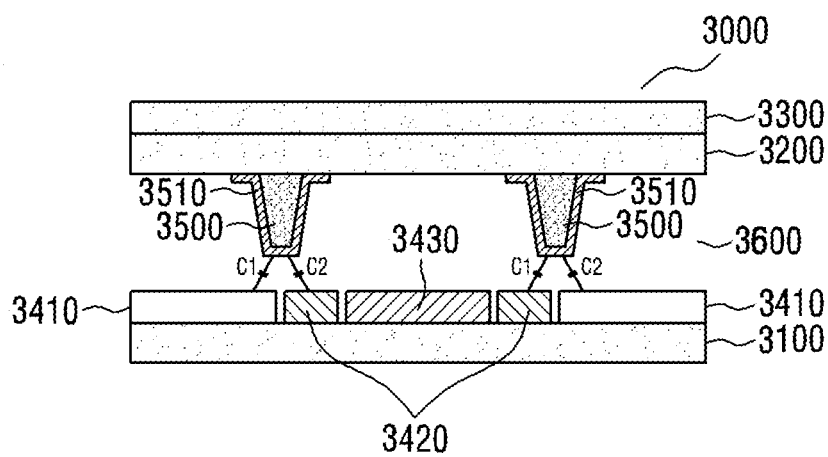
FIGS. 16b and 16c are structure views showing touch pressure sensing and touch position sensing respectively of the touch panel according to the fourth embodiment.
Figure 16C:
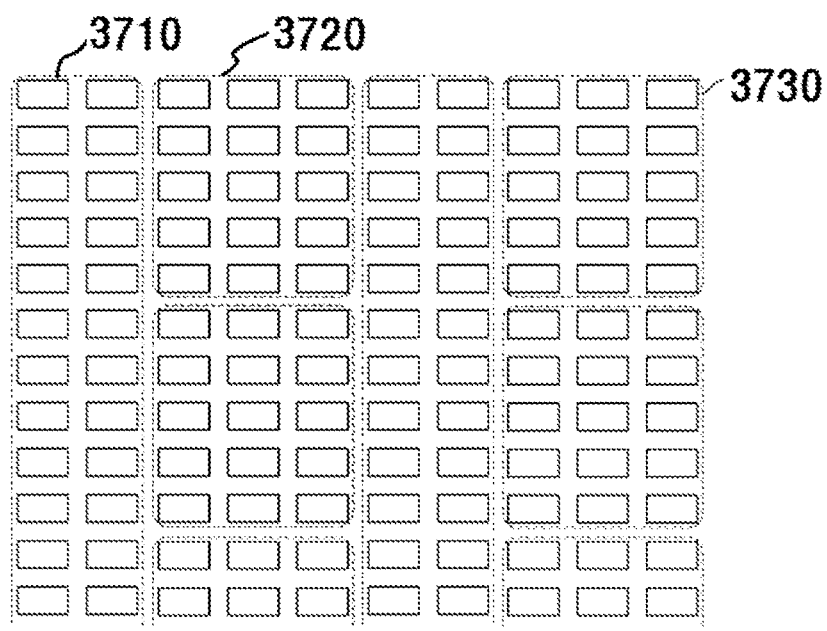

FIGS. 16b and 16c are structure views of touch pressure sensing and touch position sensing of the touch panel according to the fourth embodiment. FIGS. 16b and 16c take an LCD panel as an example of the display module 3000.

In case of the LCD panel, the display module 3000 may include a TFT layer 3100 and a color filter layer 3300. The TFT layer 3100 includes a TFT substrate layer 3110 disposed directly thereon. The color filter layer 3300 includes a color filter substrate layer 3200 disposed directly thereunder. The display module 3000 includes a liquid crystal layer 3600 between the TFT layer 3100 and the color filter layer 3300. Here, the TFT substrate layer 3110 includes electrical components necessary to generate an electric field driving the liquid crystal layer 3600. Particularly, the TFT substrate layer 3110 may be comprised of various layers including a data line, a gate line, TFT, a common electrode, a pixel electrode and the like. These electrical components generate a controlled electric field and orient the liquid crystals in the liquid crystal layer 3600. More specifically, The TFT substrate layer 3110 may include a column common electrode (column Vcom) 3430, a low common electrode (low Vcom) 3410, and a guard shield electrode 3420. The guard shield electrode 3420 is located between the column common electrode 3430 and the low common electrode 3410 and is able to minimize the interference caused by a fringe field which may be generated between the column common electrode 3430 and the low common electrode 3410. The foregoing description of the LCD panel is apparent to those skilled in the art.

As shown in FIG. 16b, the display module 3000 according to the embodiment of the present invention may include sub-photo spacers 3500 disposed on the color filter substrate layer 3200. These sub-photo spacers 3500 may be disposed on the interface between the low common electrode 3410 and the adjacent guard shield electrode 3420. Here, a conductive material layer 3510 like ITO may be patterned on the sub-photo spacer 3500. Here, a fringing capacitance C1 is formed between the low common electrode 3410 and the conductive material layer 3510, and a fringing capacitance C2 is formed between the guard shield electrode 3420 and the conductive material layer 3510.

When the display module 3000 shown in FIG. 16b functions as the touch pressure sensing module, a distance between the sub-photo spacers 3500 and the TFT substrate layer 3110 may be reduced by an external pressure, and thus, a capacitance between the low common electrode 3410 and the guard shield electrode 3420 may be reduced. Accordingly, in FIG. 16b, the conductive material layer 3510 functions as the reference potential layer and detects the change of the capacitance between the low common electrode 3410 and the guard shield electrode 3420, so that the touch pressure can be detected.

FIG. 16c shows a structure in which the LCD panel as the display module 3000 is used as the touch position sensing module. The arrangement of the common electrodes 3730 is shown in FIG. 16c. Here, for the purpose of detecting the touch position, these common electrodes 3730 may be divided into a first area 3710 and a second area 3720. Accordingly, for example, the common electrodes 3730 included in one first area 3710 may be operated in such a manner as to function in response to the first electrode 6400 of FIG. 17c, and the common electrodes 3730 included in one second area 3720 may be operated in such a manner as to function in response to the second electrode 6500 of FIG. 17c. That is, in order that the common electrodes 3730, i.e., electrical components for driving the LCD panel are used to detect the touch position, the common electrodes 3730 may be grouped. Such a grouping can be accomplished by a structural configuration and manipulation of operation.

As described above, in FIG. 16, the electrical components of the display module 3000 are caused to operate in conformity with their original purpose, so that the display module 3000 performs its own function. Also, at least some of the electrical components of the display module 3000 are caused to operate for detecting the touch pressure, so that the display module 3000 functions as the touch pressure sensing module. Also, at least some of the electrical components of the display module 3000 are caused to operate for detecting the touch position, so that the display module 3000 functions as the touch position sensing module. Here, each operation mode may be performed in a time-division manner. In other words, the display module 3000 may function as the display module in a first time interval, as the pressure sensing module in a second time interval, and/or as the position sensing module in a third time interval.

FIGS. 16b and 16c only show the structures for the detection of the touch pressure and the touch position respectively for convenience of description. So long as the display module 3000 can be used to detect the touch pressure and/or the touch position by operating the electrical components for the display operation of the display module 3000, the display module 3000 can be included in the fourth embodiment.

FIG. 1 is a system for controlling an object action according to an embodiment of the present invention.

Referring to FIG. 1, the object action control system 1 includes a touch sensing module 10, the touch panel 20, a change sensing module 30 and an action module 40.

Also, the term "module" used herein represents a logical constituent unit. It is apparent to those skilled in the art that the "module" is not necessarily physically distinguished.

The touch panel 20 is able to detect whether or not an input means touches the touch panel 20, touch pressure magnitude, touch area and/or touch time period. The touch panel 20 corresponds to a kind of a sensor. The touch panel 20 may has a concept of a touch screen. A user touches the surface of the touch panel 20 according to the embodiment of the present invention with his/her finger, etc., so that the user is allowed to operate the object action control system 1.

When the input means touches the surface of the touch panel 20 according to the embodiment of the present invention, whether the touch occurs or not, touch position, touch pressure magnitude, touch area and/or touch time period can be detected by the touch panel 20. The object action control system 1 analyzes the touch, and thereby performing an action control.

The touch sensing module 10 is able to recognize whether or not at least one input means inputs a single touch or multiple touches on the touch panel 20, to detect a state where the touch panel 20 has been pressed, and to the touch position (or coordinate) of the touch panel. In the object action control system 1 according to the embodiment of the present invention, the touch sensing module 10 is able to measure a capacitance change amount due to the touch on the touch panel 20.

When the at least one input means touches the touch panel 20 once within a predetermined time period, the touch sensing module 10 recognizes the touch as a single touch, and when the at least one input means touches the touch panel 20 at least twice within a predetermined time period, the touch sensing module 10 recognizes the touch as multiple touches.

When the input means touches the touch panel 20, the change sensing module 30 is able to sense the changes of the touch pressure magnitude, touch area and/or touch time period, and to digitize and store the changes in the object action control system 1.

Figure 2:
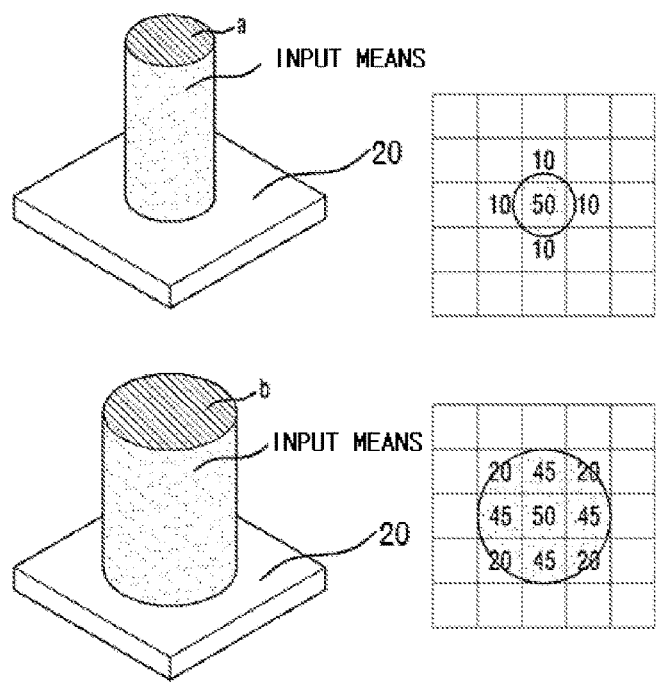
FIG. 2 is a view for describing a capacitance change amount due to the touch area.

Specifically, the change sensing module 30 may calculate the area of the touch on the touch panel 20 on the basis of the capacitance change amount measured by the touch sensing module 10. The change sensing module 30 may calculate the area of the touch on the basis of the capacitance change amount due to the touch applied to the touch panel 20 by the input means. For example, as shown in FIG. 2, when the area of the input means touching the touch panel 20 is "a", the sum of the capacitance change amounts is 90 (=50+10+10+10+10). Also, when the area of the input means touching the touch panel 20 is "b", the sum of the capacitance change amounts is 310 (=50+45+45+45+45+20+20+20+20). That is, the area of the touch on the touch panel 20 can be calculated by the capacitance change amount in the touch panel 20.

Figure 3:
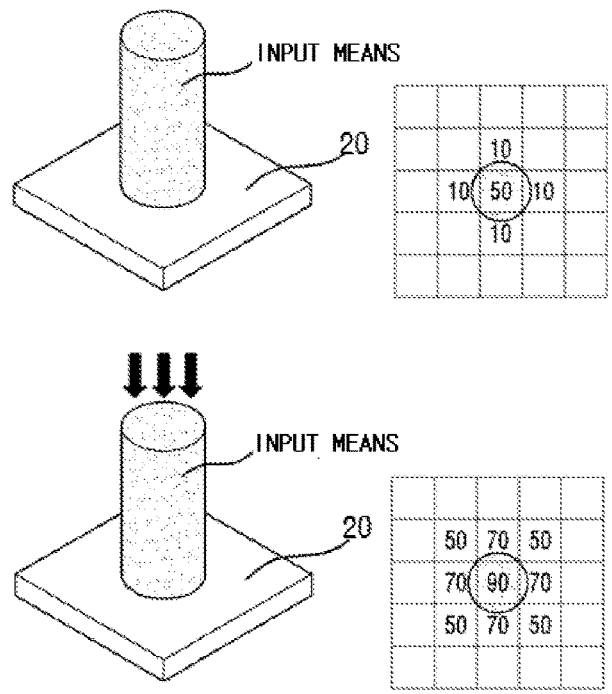
FIG. 3 is a view for describing the capacitance change amount due to the touch pressure.

Also, the pressure magnitude of the touch on the touch panel 20 by the input means may be calculated on the basis of the capacitance change amount. More specifically, the sum of the capacitance change amounts may be increased with the increase of the pressure magnitude of the touch on the touch panel 20 by the input means. For example, as shown in the top part of FIG. 3, when the input means touches the touch panel 20 without pressure, the sum of the capacitance change amounts is 90 (=50+10+10+10+10). Here, the touch area may be the same as "a" of FIG. 2. Also, as shown in the bottom part of FIG. 3, when the input means having the same touch area as that of the input means of the top part of FIG. 3 touches the touch panel 20 by applying a pressure, the sum of the capacitance change amounts is 570 (=90+70+70+70+70+50+50+50+50).

That is, even when the area of the touch on the touch panel 20 by the input means becomes larger or even when the area of the touch does not become larger, it can be seen that the sum of the capacitance change amounts is changed with the increase of the magnitude of the touch pressure. Therefore, in the embodiment of the present invention, when the area of the input means touching the touch panel 20 is changed and/or when the pressure magnitude of the touch on the touch panel 20 is changed, the change sensing module 30 may sense such that the touch area and/or touch pressure magnitude are changed on the basis of the capacitance change amount.

Also, when the input means touches the touch panel 20, the change sensing module 30 is able to sense the touch time period, and to digitize and store the touch time period in the object action control system 1.

Figure 4A:
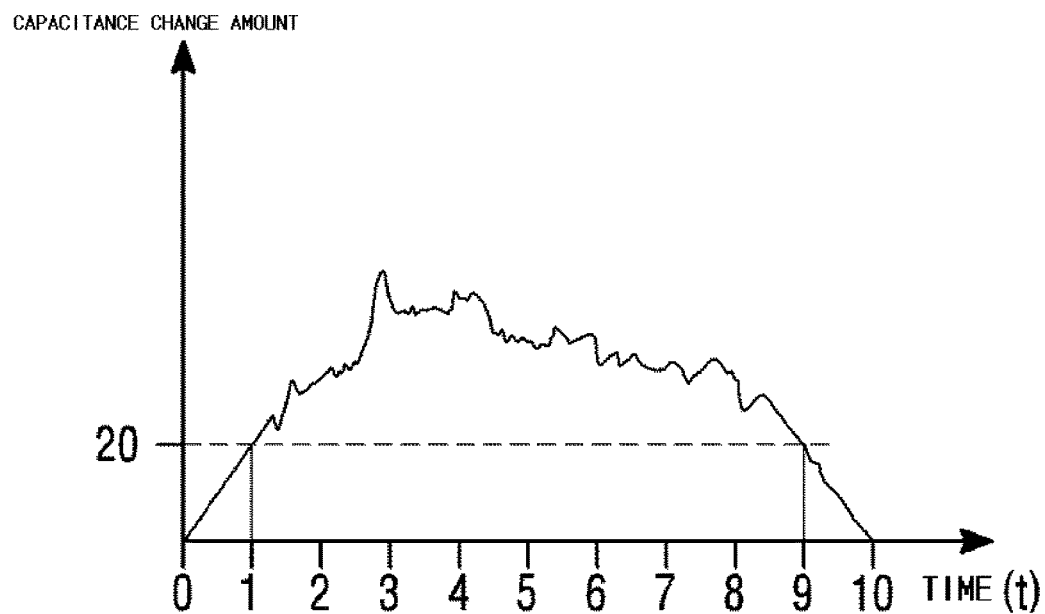
FIGS. 4a and 4b are views for describing a touch time period.
Figure 4B:
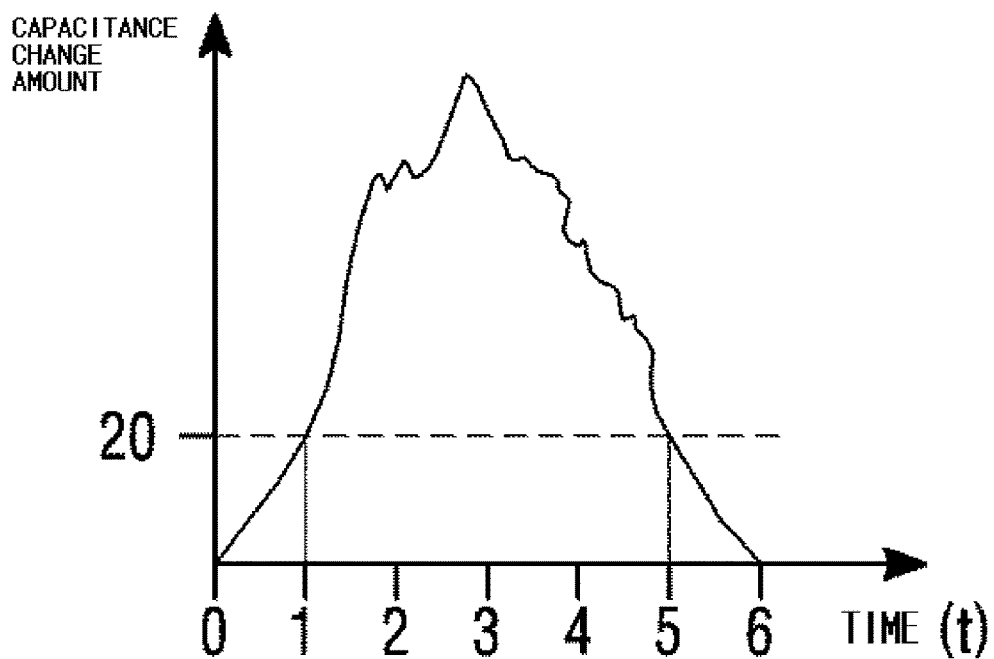

Also, the change sensing module 30 may calculate the time period of the touch on the touch panel 20 on the basis of the capacitance change amount measured by the touch sensing module 10. The change sensing module 30 may calculate the touch time period on the basis of the time-based capacitance change amount due to the touch applied to the touch panel 20 by the input means. For example, the touch time period may be a time period during which the capacitance change amount is maintained greater than a predetermined value. Here, the predetermined value may be a minimum capacitance change amount for the touch on the touch panel 20 to be recognized as a valid touch or may be a value determined as needed according to the embodiment. FIG. 4a shows that the predetermined value is 20, and the touch time period may be 8t (=9t−1t). Also, the touch time period of FIG. 4b may be 4t (=5t−1t).

For instance, the change sensing module 30 is able to sense the change of the pressure magnitude of the touch, the change of the area of touch, the touch time period and/or the change of the number of the touches occurring within a predetermined time period. The more the sensed touch pressure magnitude, the sensed touch area and/or sensed touch time period are, the numerically larger the sensed touch pressure magnitude, the sensed touch area and/or sensed touch time period are. The change sensing module 30 senses the changes and causes the action module 40 to perform the action of the object.

According to the embodiment of the present invention, as described above, the touch pressure magnitude, touch area, touch time period and/or the number of the touches can be sensed and applied to various embodiments.

In the embodiment of the present invention, when an object which requires a dual action is caused to perform the dual action, a first action of the dual action may be performed by the single touch according to the touch pressure magnitude, touch area and/or touch time period of a first predetermined condition, and the other of a second action may be performed by the multiple touches including a first touch and a second touch. The first touch depends on the touch pressure magnitude, touch area and/or touch time period of a second predetermined condition. The second touch follows the first touch and depends on the touch pressure magnitude, touch area and/or touch time period of the first predetermined condition which is the same as that of the single touch.

Here, the single touch and the multiple touches may occur within a predetermined time interval respectively. That is, in the embodiment of the present invention, two actions of a particular object are all performed by the touch according to the touch pressure magnitude, touch area and/or touch time period of the first predetermined condition. Here, in order to distinguish the two actions, the touch further occurs on any one of the two actions in accordance with the touch pressure magnitude, touch area and/or touch time period of the second predetermined condition, prior to the occurrence of the touch according to the touch pressure magnitude, touch area and/or touch time period of the first predetermined condition.

Figure 5:
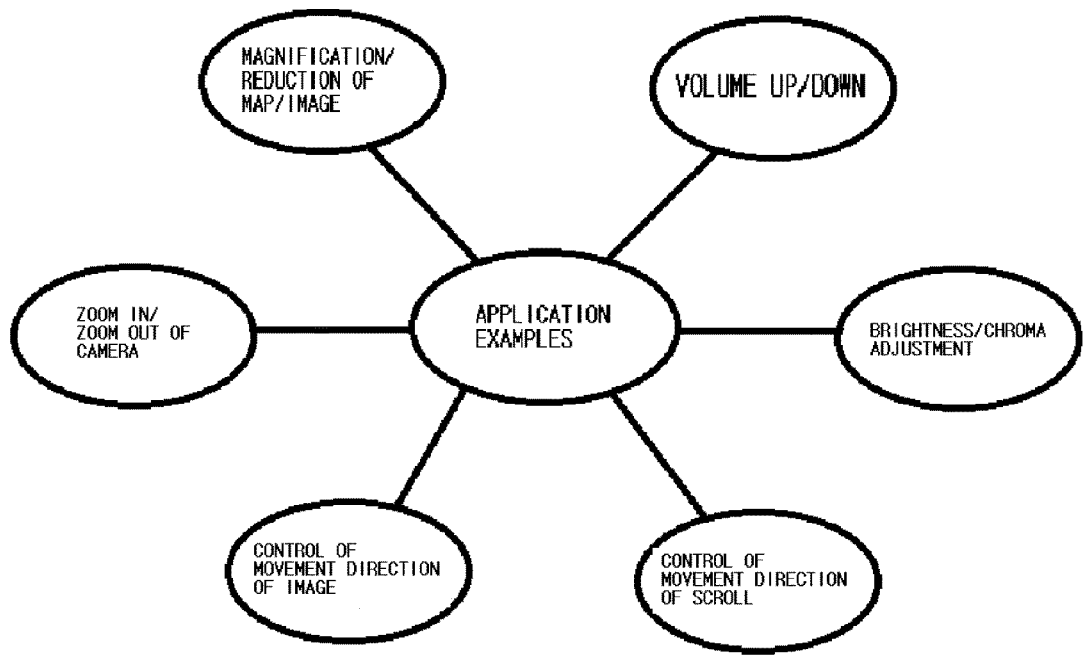
FIG. 5 is a view showing application examples of the object action control based on a single touch and multiple touches according to the embodiment of the present invention.

FIG. 5 is a view showing application examples of the object action control based on the single touch and multiple touches according to the embodiment of the present invention.

Referring to FIG. 5, the object action based on the single touch and multiple touches according to the embodiment of the present invention may include volume up/down, magnification/reduction of a map/image, zoom in/zoom out of a camera, control of the movement direction of the image, control of the movement direction of a scroll, brightness adjustment, and chroma adjustment.

The application example will be described in more detail. The magnification/reduction of the map/image represents that the size of content displayed on the touch panel 20 becomes larger or smaller. For example, when a map is displayed on the touch panel 20, the map can be magnified or reduced. Otherwise, a particular image displayed on the touch panel 20 can be magnified or reduced. For example, only a picture displayed on the touch panel 20 can be magnified or reduced. The volume up/down represents that when an apparatus including the object action control system 1 according to the embodiment of the present invention plays a video file or an audio file, the volume of the file is increased or decreased. The zoom in/zoom out of a camera represents that the focus of a camera including the object action control system 1 according to the embodiment of the present invention is adjusted. For example, an image of subject which is captured through the lens of the camera can be magnified or reduced. The control of the movement direction of the image represents that the up-and-down and the right-and-left movement directions of the particular image displayed on the touch panel 20 within the touch panel 20 can be controlled or a movement direction for selecting the particular image among a plurality of images can be controlled. For example, a plurality of pictures displayed on the touch panel 20 can be turned forward or backward. The movement direction of a scroll represents that when the scroll is displayed explicitly or implicitly on the touch panel 20, the scroll is able to move, for example, in the up-and-down or the right-and-left direction. The brightness/chroma adjustment represents that the brightness of the touch panel 20 is adjusted or the chroma value is adjusted.

Figure 6A:
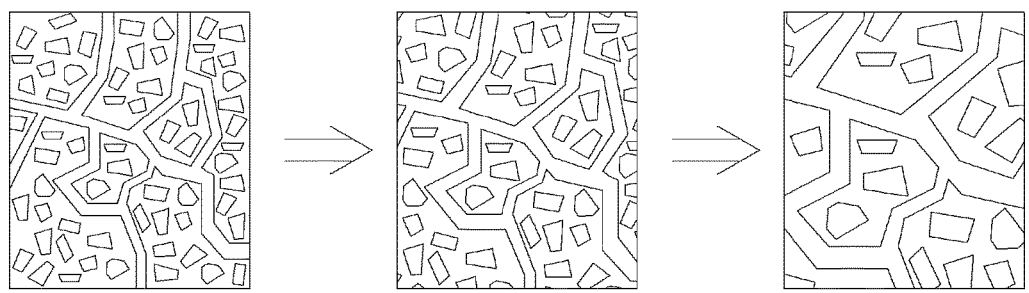
FIG. 6a shows that a map is taken as an example of the object and shows the change of a first action according to the single touch.
Figure 6B:
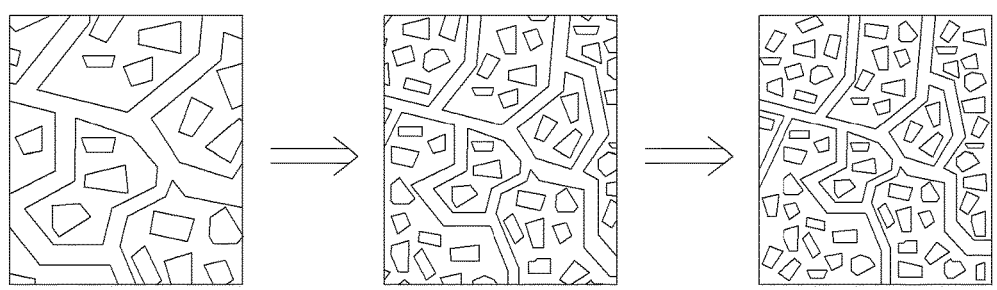
FIG. 6b shows that a map is taken as an example of the object and shows the change of a second action different from the first action according to the multiple touches.

FIGS. 6a and 6b show action examples according to the single touch and the multiple touches when the object is a map.

FIG. 6a shows that a map is taken as an example of the object and the first action is changed according to the single touch. The first action may be to magnify the map. Here, the first action may be performed by the single touch which occurs during a predetermined time period and depends on the touch pressure magnitude, touch area and/or touch time period of the first predetermined condition. It can be found that, as the single touch satisfying the first predetermined condition continues, the map is gradually magnified. Subsequently, when the finger is released from the touch panel 20, the magnification of the map stops.

When at least one of the touch pressure magnitude and touch area is changed during the performance of the action of the object, the action performance condition may be changed. When the map is magnified, map magnification rate can be increased by increasing the touch pressure and/or by increasing the touch area at the time of the single touch of the first predetermined condition, and the map magnification rate can be decreased by reducing the touch pressure and/or by reducing the touch area. Here, only when the first predetermined condition is continuously satisfied, the first action can be maintained.

FIG. 6a shows that a map is taken as an example of the object and the second action different from the first action is changed according to the multiple touches. As shown in FIG. 6b, the second action may be to reduce the map. Here, the second action may be performed by the multiple touches within a predetermined time interval. Here, the multiple touches further include the first touch according to the touch pressure magnitude, touch area and/or touch time period of the second predetermined condition, prior to the occurrence of the second touch according to the touch pressure magnitude, touch area and/or touch time period of the first predetermined condition which is the same as that of the single touch. For the purpose of distinguishing the single touch and the multiple touches, the first touch is included in the multiple touches. The first touch of the second predetermined condition occurs and the second touch of the first predetermined condition occurs within the predetermined time interval. It can be found that, as the second touch satisfying the first predetermined condition continues, the map is gradually reduced. Subsequently, when the finger is released from the touch panel 20, the reduction of the map stops.

When the map is reduced, the map magnification rate can be increased by increasing the touch pressure and/or by increasing the touch area at the time of the second touch after the first touch, and a map reduction rate can be decreased by reducing the touch pressure and/or by reducing the touch area. Here, only when the first predetermined condition is continuously satisfied, the first action can be maintained.

Also, when the object action is the volume adjustment, an action to increase the volume may correspond to the first action, and an action to decrease the volume may correspond to the second action. Here, the first action may be performed by the single touch which occurs during a predetermined time period and depends on the touch pressure magnitude, touch area and/or touch time period of the first predetermined condition. Here, the second action may be performed by the multiple touches within a predetermined time interval. Here, the multiple touches further include the first touch according to the touch pressure magnitude, touch area and/or touch time period of the second predetermined condition, prior to the occurrence of the second touch according to the touch pressure magnitude, touch area and/or touch time period of the first predetermined condition which is the same as that of the single touch. For the purpose of distinguishing the single touch and the multiple touches, the first touch is included in the multiple touches.

Here, when the volume is increased, a volume increase rate can be increased by increasing the touch pressure and/or by increasing the touch area at the time of the single touch of the first predetermined condition, and the volume increase rate can be decreased by reducing the touch pressure and/or by reducing the touch area. Here, only when the first predetermined condition is continuously satisfied, the first action can be maintained. Likewise, when the volume is decreased, a volume decrease rate can be increased by increasing the touch pressure and/or by increasing the touch area at the time of the second touch after the first touch, and the volume decrease rate can be decreased by reducing the touch pressure and/or by reducing the touch area.

The operation for the dual action can be applied to other object in the same way. Also, an action condition which is changed according to the touch pressure magnitude and/or touch area may be different according to the object and may be set according to the embodiment.

When the at least one input means inputs the single touch or multiple touches on the touch panel 20, the action module 40 identifies the object according to the single touch or multiple touches, and causes the object to perform a predetermined action according to the single touch or multiple touches in accordance with the touch pressure magnitude, touch area and/or touch time period sensed by the change sensing module 30 and their changes.

When the change sensing module 30 senses the single touch, the action module 40 performs the first action of the object, and when the change sensing module 30 senses that the touch pressure magnitude, touch area and/or touch time period of the first predetermined condition for the single touch are not maintained, the action module 40 may stops performing the first action. The change sensing module 30 determines whether or not a new single touch or new multiple touches occur later on, and then the action module 40 may perform the first action again or may perform the second action.

Also, the action module 40 performs the first action and the second action of the object according to the sensed touch pressure magnitude, touch area and/or touch time period due to the single touch and multiple touches. When the touch pressure magnitude, touch area and/or touch time period according to the condition of each of the single touch and multiple touches are not maintained, the action module 40 stops performing the first action and the second action.

An object action control method based on the touch which is performed by the object action control system 1 will be described below in detail.

Figure 7:
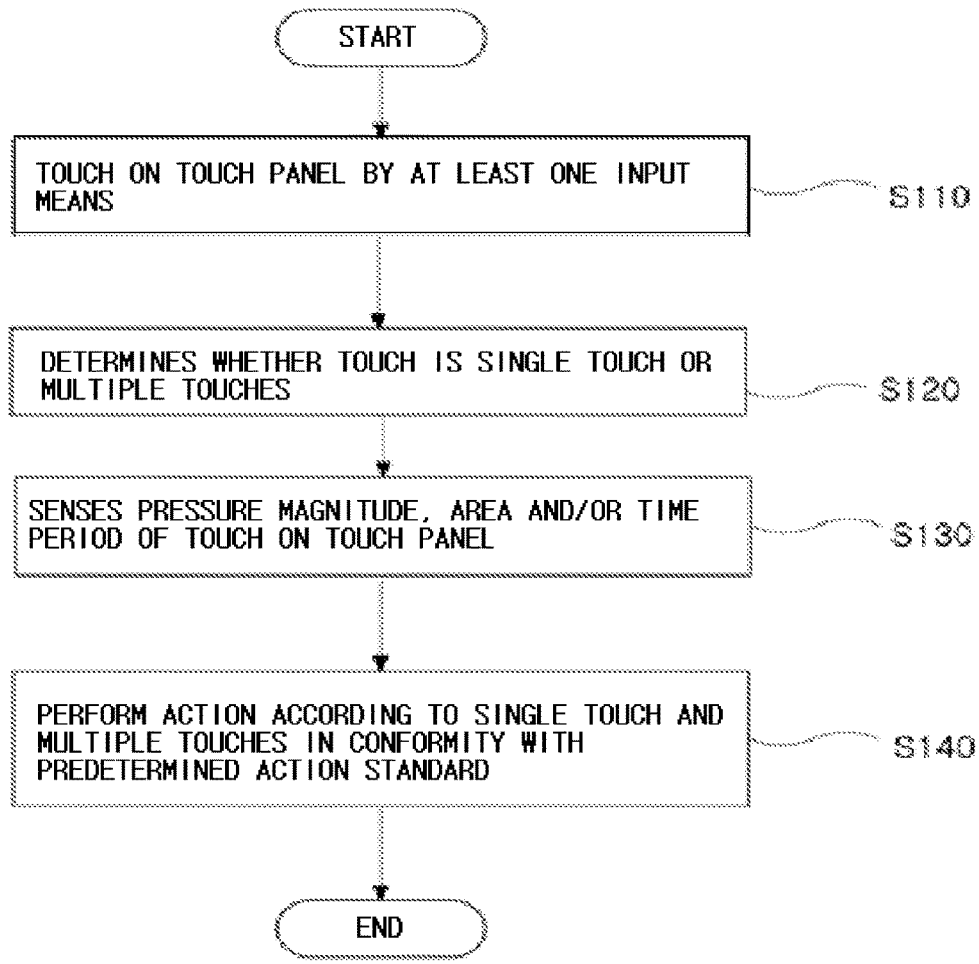
FIG. 7 is a flowchart showing an object action control method based on the touch according to the embodiment of the present invention.

FIG. 7 is a flowchart showing an object action control method based on the touch according to the embodiment of the present invention.

Referring to FIG. 7, the object action control system 1 recognizes the touch on the touch panel 20 by the at least one input means (S110). Here, the at least one input means may correspond to a part of human body, a stylus pen or the like.

The object action control system 1 according to the embodiment of the present invention determines whether the touch is the single touch or multiple touches (S210). The single touch may be one touch which has the touch pressure magnitude, touch area and/or touch time period of the first predetermined condition during the predetermined time period. The multiple touches may include the first touch which has the touch pressure magnitude, touch area and/or touch time period of the second predetermined condition during the predetermined time period, and the second touch which has the touch pressure magnitude, touch area and/or touch time period of the first predetermined condition during the predetermined time period.

For example, the touch pressure magnitude, touch area and/or touch time period of the first predetermined condition may include a case where the touch pressure magnitude has a value greater than a predetermined value, a case where the touch pressure magnitude gradually increases from the predetermined value, a case where the touch area is maintained greater than a predetermined value, a case where the touch area gradually increases from the predetermined value, a case where the touch time period maintained greater than a predetermined value, a case obtained through a combination of the at least two of the above cases. The touch pressure magnitude, touch area and/or touch time period of the second predetermined condition may include a case where the touch pressure magnitude has a value less than a predetermined value, a case where the touch pressure magnitude gradually decreases from the predetermined value, a case where the touch area is maintained less than a predetermined value, a case where the touch area gradually decreases from the predetermined value, a case where the touch time period maintained less than a predetermined value, a case obtained through a combination of the at least two of the above cases.

The object action control system 1 is able to first identify the object according to the single touch or multiple touches. The identification may be performed after the object action control system 1 recognizes the touch on the touch panel 20 or after object action control system 1 determines whether the touch is the single touch or multiple touches.

The object may correspond to a particular object on the touch panel 20, which is output by a program that is executed by the object action control system 1. For example, the object may include the scroll on the touch panel 20, the map on the touch panel 20, the volume of an audio, the playing speed of a video.

Here, the identifying the object is not necessarily required. For instance, when the map is displayed on the touch panel 20, the object according to the touch on the touch panel 20 may be immediately determined as the magnification and/or reduction of the map. Also, when a volume key is displayed on the touch panel 20 and the touch occurs on the volume key, the object according to the touch may be immediately determined as the volume key.

The object action control system 1 senses the pressure magnitude, area and/or time period of the touch on the touch panel 20 which the input means has touched (S130).

When a touch condition according to the single touch and multiple touches is continuously satisfied as a result of the sensing, the object action control system 1 may perform an action according to the single touch and multiple touches in conformity with a predetermined action standard (S140).

The object action control system 1 may inwardly digitize the capacitance change amount and sense the changes of the pressure magnitude and/or area according to the touch. For example, when the sum of the inwardly digitized capacitance change amount increases from 10 to 20, the object action control system 1 may sense that the touch pressure magnitude and/or touch area increase, and when the sum of the inwardly digitized capacitance change amount decreases from 10 to 5, the object action control system 1 may sense that the pressure magnitude and/or area of the touch on the touch panel 20 decrease. Here, the object action control system 1 may inwardly digitize the sum of the capacitance change amounts and sense the changes of the pressure magnitude and/or area according to the touch. When the first predetermined condition is satisfied and the changes of the pressure magnitude and/or area according to the touch are sensed, the performance of the first action and the performance of the second action may be changed according to the touch. For example, in a case where the first action of the object is to magnify the map, when the touch pressure magnitude gradually increases, the map magnification rate may gradually increase. Otherwise, in a case where the second action of the object is to reduce the map, when the touch pressure magnitude gradually increases, the map magnification rate may gradually increase. As such, the action condition of the object may be changed according to the changes of the touch pressure magnitude and/or touch area.

Also, in the sensing S130 of the pressure magnitude, area and/or time period of the touch on the touch panel, when the object action control system 1 senses that the touch does not continue any more or the touch does not satisfy the first predetermined condition any more, the object action control system 1 may stop performing the action according to the single touch or multiple touches.

In other words, as a result of sensing the touch pressure magnitude, touch area and/or touch time period, when it is determined that the pressure magnitude, area and/or time period due to the corresponding touch are not maintained, the action corresponding to the touch may be stopped. The object action control system 1 may sense whether or not a new touch corresponding to the single touch or multiple touches is input later on.

Figure 8A:
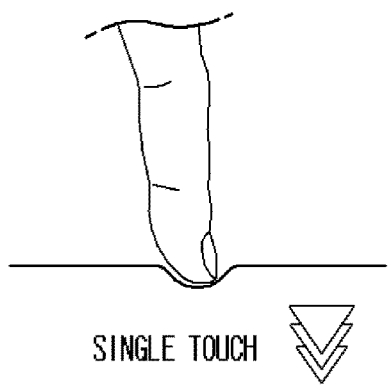
FIGS. 8a and 8b show the single touch and the multiple touches respectively in accordance with the embodiment of the present invention.
Figure 8B:
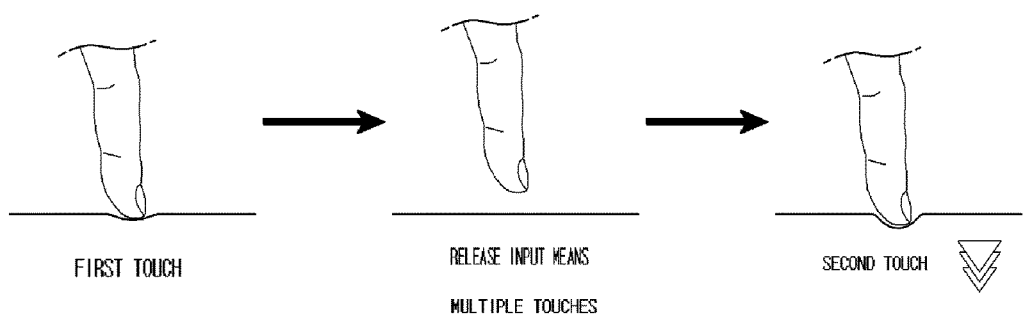

FIGS. 8a and 8b show the single touch and the multiple touches respectively in accordance with the embodiment of the present invention.

Referring to FIGS. 8a and 8b, here, the input means corresponds to a part of human body, i.e., finger and FIGS. 8a and 8b show that the finger presses the touch panel 20. FIG. 8a shows the single touch according to the embodiment of the present invention. Here, the single touch refers to one touch which satisfies the first predetermined condition during the predetermined time period. The single touch may have the touch pressure magnitude, touch area and/or touch time period of the first predetermined condition.

FIG. 8b shows the multiple touches according to the embodiment of the present invention. The multiple touches may include two touches during the predetermined time period. That is, the multiple touches may include the first touch and the second touch. Here, the second touch may have the same condition as that of the single touch shown in FIG. 8a. The first touch may have a smaller touch pressure magnitude, a smaller touch area, a smaller touch time period than those of the second touch, or may have a case obtained through a combination of the foregoing. Here, a time period for releasing the input means from the touch panel 20 may be included between the first touch and the second touch. The release time period may be relatively shorter than the touch time period of the second touch.

In this specification, the single touch may be one touch during the predetermined time period and may satisfy the first predetermined condition. The multiple touches may include the first touch which occurs during the predetermined time period and satisfies the second predetermined condition, and the second touch which satisfies the first predetermined condition. Here, the predetermined time period may be set to be different according to the embodiment. Also, the first predetermined condition and the second predetermined condition may be also set to be different according to the embodiment.

The present invention can be implemented by means of a computer-readable code in a computer-readable recording medium. The computer-readable recording medium includes all kinds of recording media in which data readable by a computer system is stored.

The computer-readable recording medium includes ROM, RAM, CD-ROM, a magnetic tape, a floppy disc, an optical data storage device, etc., as an example thereof. Also, a program code for performing the method for controlling the object action based on the touch according to the embodiment of the present invention may be transmitted in the form of a carrier wave (e.g., transmission through Internet).

The computer-readable recording medium is distributed in the computer system connected through a network and computer-readable codes can be stored in a distribution method and executed. Functional programs, codes, and code segments for implementing the embodiment of the present invention can be easily inferred by programmers in the art to which the present invention belongs.

Although the present invention has been described with reference to the embodiment shown in the drawings, this is just an example and it will be understood by those skilled in the art that various modifications and equivalent thereto may be made. Therefore, the true technical scope of the present invention should be determined by the spirit of the appended claims.

What is claimed is:

1. A method for controlling an object action which is performed by an object action control system and is based on a single touch and multiple touches, the method comprising:
   recognizing a touch on a touch panel by at least one input means;
   sensing at least one of a pressure magnitude and an area of the touch and determining whether the touch is the single touch or multiple touches which occur within a predetermined time period; and
   performing an action of one object in accordance with the single touch or multiple touches based on the determination result in conformity with a predetermined action standard;
   wherein, when the at least one input means inputs the touch once on the touch panel within the predetermined time period, which satisfies at least one of a pressure magnitude and an area of the touch of a first predetermined condition, the touch is recognized as the single touch; and
   wherein, when the at least one input means inputs the touch twice on the touch panel within the predetermined time period, including a first touch which satisfies at least one of a pressure magnitude and an area of the touch of a second predetermined condition different from the first predetermined condition and a second touch which satisfies at least one of a pressure magnitude and an area of the touch of the first predetermined condition, the touch is recognized as the multiple touches; and
   wherein the performing the action in accordance with the single touch or multiple touches comprises:
   performing a first action of the object according to the single touch;
   performing a second action different from the first action of the object according to the multiple touches;
   stopping the performance of the first action and the second action when it is determined that at least one of the pressure magnitude and area of the touch due to the single touch or multiple touch is not maintained; and
   wherein the stopping of the performance of the first action and the second action occurs despite the touch being maintained.

2. The method of claim 1, wherein the performing the action according to the single touch or multiple touches further comprises: when the single touch or multiple touches are sensed after the first action or the second action is stopped, performing again the first action or the second action of the object.

3. An object action control system which performs a method for controlling the object action on the basis of a touch, the system comprising:
   a touch panel;

a touch sensing controller which recognizes a touch on the touch panel by at least one input means;

a change sensing controller which senses at least one of a pressure magnitude and an area of the touch on the touch panel by the input means which has applied to single touch or multiple touches; and a processor which performs an action of one object in accordance with the single touch or multiple touches in conformity with a predetermined action standard;

wherein, when the at least one input means inputs the touch once on the touch panel within the predetermined time period, which satisfies at least one of a pressure magnitude and an area of the touch of a first predetermined condition, the touch is recognized as the single touch;

wherein, when the at least one input means inputs the touch twice on the touch panel within the predetermined time period, including a first touch which satisfies at least one of a pressure magnitude and an area of the touch of a second predetermined condition different from the first predetermined condition and a second touch which satisfies at least one of a pressure magnitude and an area of the touch of the first predetermined condition, the touch is recognized as the multiple touches; and wherein the processor performs the action of the object in accordance with the single touch or multiple touches comprises:

performs a first action of the object according to the single touch;

performs a second action different from the first action of the object according to the multiple touches; and stops the performance of the first action and the second action when it is determined that at least one of the pressure magnitude and area of the touch due to the single touch or multiple touch is not maintained; and wherein the stopping of the performance of the first action and the second action occurs despite the touch being maintained.

4. An object action control system which performs a method for controlling the object action on the basis of a touch, the system comprising:

a touch panel;

a touch sensing controller which recognizes a touch on the touch panel by at least one input means;

a processor which determines at least one of a pressure magnitude and an area of the touch on the touch panel by the input means and determines whether the touch is a single touch or multiple touches; and wherein the processor performs an action of one object in accordance with a single touch or multiple touches in conformity with a predetermined action standard;

wherein, when the at least one input means inputs the touch once on the touch panel within the predetermined time period, which satisfies at least one of a pressure magnitude and an area of the touch of a first predetermined condition, the touch is recognized as the single touch;

wherein, when the at least one input means inputs the touch twice on the touch panel within the predetermined time period, including a first touch which satisfies at least one of a pressure magnitude and an area of the touch of a second predetermined condition different from the first predetermined condition and a second touch which satisfies at least one of a pressure magnitude and an area of the touch of the first predetermined condition, the touch is recognized as the multiple touches; and wherein the processor performs the action of the object in accordance with the single touch or multiple touches comprises:

performs a first action of the object according to the single touch;

performs a second action different from the first action of the object according to the multiple touches; and stops the performance of the first action and the second action when it is determined that at least one of the pressure magnitude and area of the touch due to the single touch or multiple touch is not maintained; and wherein the stopping of the performance of the first action and the second action occurs despite the touch being maintained.

5. An object action control system which performs a method for controlling the object action on the basis of a touch, the system comprising:

a touch panel;

a touch sensing controller which measures a capacitance of the touch panel;

a processor which determines a capacitance change by at least one input means and determines at least one of a pressure magnitude and an area of the touch on the touch panel based on the capacitance change and determines whether the touch is a single touch or multiple touches based on the at least one of the pressure magnitude and the area of the touch; and wherein the processor performs an action of one object in accordance with the single touch or multiple touches in conformity with a predetermined action standard;

wherein, when the at least one input means inputs the touch once on the touch panel within the predetermined time period, which satisfies at least one of a pressure magnitude and an area of the touch of a first predetermined condition, the touch is recognized as the single touch;

wherein, when the at least one input means inputs the touch twice on the touch panel within the predetermined time period, including a first touch which satisfies at least one of a pressure magnitude and an area of the touch of a second predetermined condition different from the first predetermined condition and a second touch which satisfies at least one of a pressure magnitude and an area of the touch of the first predetermined condition, the touch twice is recognized as the multiple touches; and wherein the processor performs the action of the object in accordance with the single touch or multiple touches comprises:

performs a first action of the object according to the single touch;

performs a second action different from the first action of the object according to the multiple touches; and stops the performance of the first action and the second action when it is determined that at least one of the pressure magnitude and area of the touch due to the single touch or multiple touch is not maintained; and wherein the stopping of the performance of the first action and the second action occurs despite the touch being maintained.

* * * * *